US011732743B2

(12) United States Patent
Stevens et al.

(10) Patent No.: US 11,732,743 B2
(45) Date of Patent: Aug. 22, 2023

(54) ANCHORING NUT FOR AN EME PROTECTION CAP SYSTEM

(71) Applicant: THE BOEING COMPANY, Chicago, IL (US)

(72) Inventors: Bart Stevens, Summerville, SC (US); Daniel J. Cowan, North Charleston, SC (US); Sean Auffinger, Ladson, SC (US); Brandon Mulligan, Charleston, SC (US)

(73) Assignee: The Boeing Company, Chicago, IL (US)

( * ) Notice: Subject to any disclaimer, the term of this patent is extended or adjusted under 35 U.S.C. 154(b) by 151 days.

(21) Appl. No.: 17/179,898

(22) Filed: Feb. 19, 2021

(65) Prior Publication Data

US 2021/0190124 A1  Jun. 24, 2021

Related U.S. Application Data

(62) Division of application No. 15/960,835, filed on Apr. 24, 2018, now Pat. No. 10,962,043.

(51) Int. Cl.
*F16B 37/14* (2006.01)
*F16B 33/00* (2006.01)
(Continued)

(52) U.S. Cl.
CPC .............. *F16B 37/14* (2013.01); *F16B 33/004* (2013.01); *F16B 37/125* (2013.01); *B64D 45/02* (2013.01)

(58) Field of Classification Search
CPC ...... F16B 33/004; F16B 37/125; F16B 37/14; B64D 45/02; Y10S 411/91
(Continued)

(56) References Cited

U.S. PATENT DOCUMENTS 1,252,310 A * 1/1918 Stafford et al. ......... F16B 37/14
411/374
1,264,569 A * 4/1918 Stafford ................. F16B 37/14
411/374
(Continued)

FOREIGN PATENT DOCUMENTS

CA       2856687 A1    3/2015
CA       2858461 A1    3/2015
(Continued)

OTHER PUBLICATIONS

Extended European Search Report for EP Application No. 21161373.2 dated Jul. 21, 2021.
(Continued)

*Primary Examiner* — Roberta S Delisle
(74) *Attorney, Agent, or Firm* — Quinn IP Law

(57) ABSTRACT

A cap system for enclosing a metallic fastener assembly extending through a structure, which includes a first securement mechanism positioned about a periphery of a nut member of the metallic fastener assembly, wherein the first securement mechanism comprises a plurality of continuous grooves which extend about the periphery of the nut member. The cap system further includes a cap member which includes a sidewall having an inner surface which defines a cavity dimensioned to receive the nut member and defines a second securement mechanism complementary configured to engage the first securement mechanism positioned about the periphery of the nut member. The cap system also includes an end of the sidewall of the cap member defines an opening which provides the nut member to have access into the cavity.

20 Claims, 16 Drawing Sheets

(51) Int. Cl.
  *F16B 37/12* (2006.01)
  *B64D 45/02* (2006.01)

(58) Field of Classification Search
  USPC .......................... 411/372.5, 372.6, 373, 374
  See application file for complete search history.

(56) References Cited

U.S. PATENT DOCUMENTS

| | | | |
|---|---|---|---|
| 1,368,637 | A | 2/1921 | McFarland |
| 1,868,084 | A | 7/1932 | Wheelwright |
| 2,020,522 | A | 11/1935 | Seguin |
| 3,699,368 | A | 10/1972 | Palmer |
| 4,013,190 | A | 3/1977 | Wiggins et al. |
| 4,295,766 | A | 10/1981 | Shaw |
| 4,519,974 | A | 5/1985 | Bravenec et al. |
| 4,630,168 | A | 12/1986 | Hunt |
| 4,636,446 | A | 1/1987 | Lee |
| 4,826,380 | A | 5/1989 | Henry |
| 4,850,778 | A * | 7/1989 | Clough ............... F16B 37/0842 411/324 |
| 4,884,933 | A | 12/1989 | Preusker et al. |
| 5,108,853 | A | 4/1992 | Feres |
| 5,139,380 | A * | 8/1992 | Reynolds ............... F16B 37/02 411/937.1 |
| 5,350,266 | A | 9/1994 | Espey et al. |
| 5,752,794 | A | 5/1998 | Krawczak |
| 6,053,683 | A * | 4/2000 | Cabiran ................ F16B 37/14 411/374 |
| 6,102,128 | A | 8/2000 | Bridgeman |
| 6,318,942 | B1 | 11/2001 | Wieczorek |
| 7,134,666 | B2 | 11/2006 | Beyssac et al. |
| 7,755,876 | B2 | 7/2010 | Morrill et al. |
| 7,918,081 | B2 | 4/2011 | Schlichting et al. |
| 7,936,550 | B2 | 5/2011 | Morrill et al. |
| 8,318,942 | B2 | 11/2012 | Zhang |
| 8,388,293 | B2 | 3/2013 | Hutter, III |
| 8,711,541 | B2 | 4/2014 | Umemoto et al. |
| 8,717,735 | B2 | 5/2014 | Day et al. |
| 8,717,736 | B2 | 5/2014 | Asahara et al. |
| 8,840,740 | B2 | 9/2014 | Rorabaugh et al. |
| 8,894,338 | B2 | 11/2014 | Dobbin et al. |
| 9,133,874 | B2 | 9/2015 | Hill |
| 9,188,226 | B2 | 11/2015 | Pajel et al. |
| 9,228,604 | B2 | 1/2016 | Dobbin |
| 9,764,854 | B2 | 9/2017 | Dobbin et al. |
| 10,151,337 | B2 | 12/2018 | Hill |
| 2002/0192052 | A1 | 12/2002 | Ruspa |
| 2005/0023832 | A1 | 2/2005 | Elder |
| 2008/0137259 | A1 | 6/2008 | Heeter et al. |
| 2009/0128983 | A1 | 5/2009 | Martin Hernandez |
| 2009/0194297 | A1 | 8/2009 | Ortiz Teruel |
| 2010/0303582 | A1 | 12/2010 | Choi et al. |
| 2012/0217673 | A1 | 8/2012 | Hutter, III |
| 2013/0206759 | A1 | 8/2013 | Wurz et al. |
| 2013/0223951 | A1 | 8/2013 | Bessho et al. |
| 2014/0048198 | A1 | 2/2014 | Dobbin et al. |
| 2014/0261956 | A1 | 9/2014 | Wiseman et al. |
| 2014/0341675 | A1 | 11/2014 | Dobbin |
| 2014/0373359 | A1 | 12/2014 | Schomaker et al. |
| 2015/0060465 | A1 | 3/2015 | Limbacher et al. |
| 2015/0082603 | A1 | 3/2015 | Rawdon et al. |
| 2015/0086295 | A1 | 3/2015 | Cameron et al. |
| 2015/0184688 | A1 | 7/2015 | Dobbin et al. |
| 2015/0345533 | A1 | 12/2015 | Hill |
| 2016/0131179 | A1 | 5/2016 | Prouty et al. |
| 2016/0195125 | A1 * | 7/2016 | Dobbin ................ B64D 45/02 411/372.6 |
| 2017/0021209 | A1 | 1/2017 | Damazo et al. |
| 2017/0050746 | A1 | 2/2017 | Dobbin |
| 2017/0082131 | A1 | 3/2017 | Bessho et al. |
| 2019/0241276 | A1 | 8/2019 | Dobbin |

FOREIGN PATENT DOCUMENTS

| | | |
|---|---|---|
| CN | 105408642 A | 3/2016 |
| CN | 105473445 A | 4/2016 |
| CN | 107298182 A | 10/2017 |
| CN | 107448463 A | 12/2017 |
| DE | 1085586 B | 7/1960 |
| EP | 2610506 A1 | 7/2013 |
| EP | 2698318 A2 | 2/2014 |
| EP | 2713065 A2 | 4/2014 |
| EP | 2812248 A1 | 12/2014 |
| EP | 2860410 A1 | 4/2015 |
| EP | 2860411 A1 | 4/2015 |
| EP | 2996941 A1 | 3/2016 |
| EP | 3027917 A1 | 6/2016 |
| EP | 3059170 A1 | 8/2016 |
| EP | 3106380 A1 | 12/2016 |
| EP | 3287362 A1 | 2/2018 |
| EP | 3462046 A1 | 4/2019 |
| EP | 3546374 A1 | 10/2019 |
| FR | 2058197 A1 | 5/1971 |
| GB | 612381 A | 11/1948 |
| GB | 1180182 A | 2/1970 |
| JP | H02102910 A | 4/1990 |
| JP | H03125911 U | 12/1991 |
| JP | H08-145032 A | 6/1996 |
| JP | 2000039010 A | 2/2000 |
| JP | 2001165138 A | 6/2001 |
| JP | 2002266832 A | 9/2002 |
| JP | 2004169853 A | 6/2004 |
| RU | 2014128760 A | 2/2016 |
| WO | WO-9729289 A1 | 8/1997 |
| WO | WO-0057069 A1 | 9/2000 |
| WO | WO-2009063063 A1 | 5/2009 |
| WO | WO-2012147645 A1 | 11/2012 |
| WO | WO-2012170672 A1 | 12/2012 |
| WO | WO-2013117756 A1 | 8/2013 |
| WO | WO-2013178985 A1 | 12/2013 |
| WO | WO-2014118117 A1 | 8/2014 |
| WO | WO-2014118510 A1 | 8/2014 |
| WO | WO-2014184722 A1 | 11/2014 |
| WO | WO-2015015153 A1 | 2/2015 |
| WO | WO-2015025130 A1 | 2/2015 |

OTHER PUBLICATIONS

First Office Action for CN Application No. 2019103311537 dated Feb. 22, 2022.
Search Report for CN Application No. 2019103311537 dated Feb. 22, 2022.
Communication Pursuant to Article 94(3) EPC for EP Application No. 19167831.7 dated Feb. 23, 2022.
Notification of First Office Action for CN Application No. 2019103416596 dated Mar. 7, 2022.
Extended European Search Report for EP Application No. 22152477.0 dated Apr. 21, 2022.
http://www.ppgaerospace.com/getmedia/9a234ec3-1db9-48de-94f7-c212ac2ba705/SealCapFlyer.pdf.aspx, PPG Aerospace PRC Seal Caps, retrieved Sep. 7, 2016.
http://www.porex.com/files/documents/Porex-Battery-Vents-Letter---English, Porex Battery Vents, 2013.
Extended European Search Report for foreign counterpart EP Application No. 16173069, dated Nov. 17, 2016.
Product Literature for ERG Duocel Aluminum Foam, downloaded from ERO Aerospace website, www.ergaerospace.com/literature/erg_duocel.pdf, Jul. 9, 2015.
"HRL Researchers Develop World's Lightest Material," downloaded from HRL Laboratories website, www.hrl.com/hrlDocs/pressreleases/2011/prsRls_111117, Jul. 10, 2015.
Daniel J. Cowan et al., U.S. Appl. No. 15/964,340, filed Apr. 27, 2018.
Bart Stevens et al., U.S. Appl. No. 15/718,618, filed Sep. 28, 2017.
Sean Auffinger et al., U.S. Appl. No. 16/046,316, filed Jul. 26, 2018.
Bart Stevens et al., U.S. Appl. No. 15/960,835, filed Apr. 24, 2018.
Toulouse, Mixed Metal-Composite Assembly, May 2013.

(56) References Cited

OTHER PUBLICATIONS

Hutchinson Proprietary Document, Accessories: TP Nutcaps, 1 page.
Click Bond Cap dated May 16, 2016, 4 pgs.
Extended European Search Report for EP Application No. 18196707.6 dated Feb. 19, 2019.
EP Search Report for Application No. EP14175808 dated Mar. 6, 2015.
PRC-DESOTO International, Inc., "Technical Data Sheet Aerospace Sealants Customized Sealant Solutions PRC(R) Seal Caps," May 1, 2017, Lit, #4086, Sylmar, CA, pp. 1-2; retrieved on Dec. 4, 2018, retrieved from internet: http://www.ppgaerospace.com/getmedia/9a234ec3-1db9-48de-94f7-c212ac2ba705/SealCapFlyer.pdf.aspx.
Porex Corporation, "Porex(R) Battery Vents—Flame Arrestors," Porex Advanced Porous Materials, PXT-621-080513-00, Jan. 1, 2013, pp. 1-2, retrieved on Dec. 4, 2018, retrieved from internet: http://www.porex.com//files/documents/POREX-Battery-Vents--Letter-for-Web.pdf.
"Customized Sealants Solutions: PRC® Seal Caps," PPG Aerospace, product literature downloaded from ppaerospace.com on Sep. 7, 2016.
"HRL Researchers Develop World's Lightest Material," downloaded from HRL Laboratories website, HRL.com on Jul. 10, 2015.
"ERG Duocel® aluminum foam," product literature downloaded from ERG Aerospace website, ERGaerospace.com on Jul. 9, 2015.
Drawings of Boeing Part Standard, BACC50AP, dated Feb. 2, 2017, 2 pgs.
Photographs of Boeing Proprietary, Zap Cap Further Screening Test Plan for 787 Fuel Tank Use, Mar. 24, 2016, 1 pg.
Office Action for RU Application No. 2018127328/07 dated May 20, 2019.
EP Search Report for EP Application No. 19167831.7 dated Aug. 29, 2019.
EP Search Report for Application No. EP19166688 dated Aug. 29, 2019.
EP Office Action for Application No. 19166688.2 dated Sep. 20, 2019.
European Search Report for Application No. 19179944.4 dated Sep. 10, 2019.
Communication Pursuant to Article 94(3) dated Oct. 16, 2019.
Extended EP Search Report for EP Application No. 19207962.2 dated Mar. 26, 2020.
Extended EP Search Report for EP Application No. 19204019.4 dated Mar. 30, 2020.
Written Opinion for EP Application No. 19204019.4 dated Mar. 30, 2020.
European Search Report for EP Application No. EP19217717 dated May 8, 2020.
Extended European Search Report for EP Application No. 20176033.7 dated Oct. 23, 2020.
Office Action for CA Application No. 3,038,285 dated May 12, 2022.
Notification of Second Office Action for CN Application No. 2019103416596 dated Jul. 19, 2022.

\* cited by examiner

ANCHORING NUT FOR AN EME PROTECTION CAP SYSTEM

CROSS-REFERENCE TO RELATED APPLICATION

This application is a divisional of U.S. patent application Ser. No. 15/960,835, entitled "Anchoring Washer for an EME Protection Cap System" and filed Apr. 24, 2018, now U.S. Pat. No. 10,962,043 issued on Mar. 30, 2021, the entire disclosure of which is incorporated by reference herein.

FIELD

This disclosure relates to an electrical insulation cap assembly for insulating metallic fasteners from transmitting current or sparks into the vicinity of the location of the metallic fastener assembly with the occurrence of electromagnetic effect ("EME") or lightning strike event and more particularly for electrical insulating containment caps which enclose a metallic threaded fastener.

BACKGROUND

Electrically insulated sealant and containment caps have been used to cover an end portion of a metallic fastener assembly which includes a nut and a threaded end portion of a stud which extends beyond the nut and which may include one or more washers. The sealant caps electrically insulate the end portion of the metallic fastener assembly so as to electrically isolate and contain the end portion of the metallic fastener assembly from critical surroundings of the metallic fastener assembly such as within a vicinity of a fuel tank or sensitive electronic equipment within an aircraft. Electrically isolating and containing the end portion of the metallic fastener assembly prevents unwanted sparks or electrical current transmissions entering into such important surroundings upon an EME or lightning strike event.

The insulation and containment caps are made from sealant material such as for example a thermoset plastic. The caps are also filled with a liquid form of sealant material. Once the cap is filled with liquid sealant, the cap is positioned over the end portion of the metallic fastener assembly enclosing the end portion of the metallic fastener assembly within the cap and a surface of a structure from which the end portion of the metallic fastener assembly extends. At times sealant is expelled from the cap being over filled with sealant. This expelling of sealant can also occur by way of a sufficient amount of sealant being present such that expelling of some sealant from the cap can occur which indicates an adequate amount of sealant has been used. The expelled sealant in either occurrence must then be smoothed out about the cap to ensure proper sealing of the cap and for aesthetics. This smoothing out process is tedious and time consuming.

The cap also requires being held in place for a time period so as to maintain the cap's position to prevent an occurrence of the cap experiencing slumping or lifting off of the surface of a structure from which the end portion of the metallic fastener assembly extends during the curing of the sealant. The cap-to-structure joints are subject to high quality standards and often require rework.

There is a need to reduce the time to install EME or lightning strike event protective caps enclosing end portions of metallic fastener assemblies in high criticality areas such as in the proximity of fuel tanks or sensitive electronic equipment of an aircraft. In addition there is a need to have a reliable securement mechanism for securing the caps to the end portions of the metallic fasteners.

SUMMARY

A cap system for enclosing a metallic fastener assembly extending through a structure, includes a first securement mechanism positioned about a periphery of a nut member of the metallic fastener assembly, wherein the first securement mechanism comprises a plurality of continuous grooves which extend about the periphery of the nut member. The cap system further includes a cap member which includes a sidewall having an inner surface which defines a cavity dimensioned to receive the nut member and defines a second securement mechanism complementary configured to engage the first securement mechanism positioned about the periphery of the nut member. The cap system further includes an end of the sidewall of the cap member defines an opening which provides the nut member to have access into the cavity.

The features, functions, and advantages that have been discussed can be achieved independently in various embodiments or may be combined in yet other embodiments further details of which can be seen with reference to the following description and drawings.

DESCRIPTION

Figure 1:
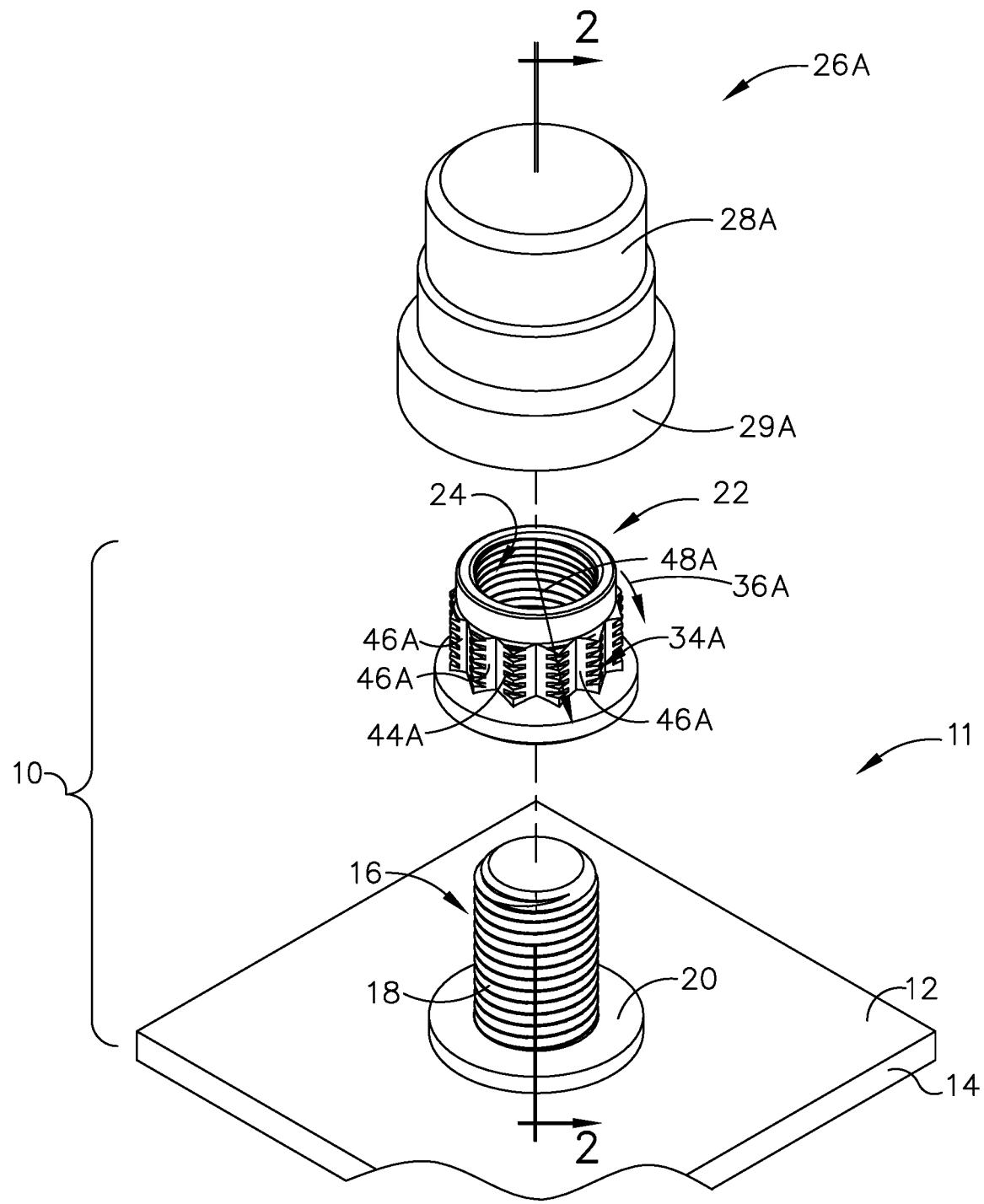
FIG. 1 is an exploded perspective view of a first embodiment of a cap system for enclosing an end portion of a metallic fastener assembly extending from a structure.

A cap system described herein will be employed to enclose an end portion of a metallic fastener assembly which is secured to a structure, in this example, a structure positioned within an aircraft. The cap system has a cap member. The cap member is to be positioned over and enclose the end portion of the metallic fastener assembly which extends from the structure and secures to the metallic fastener assembly. With an end of the cap member positioned abutting a surface of the structure, the end portion of the metallic fastener assembly is enclosed within the confines of the cap member and a surface of the structure. With positioning the cap member to enclose the end portion of the metallic fastener assembly the cap member secures to the metallic fastener assembly.

The cap is constructed of a nonconductive material such as a polymer, thermoset or of other nonconductive material and a nonconductive sealant material may be additionally used in association with the cap member to further electrically isolate the end portion of the metallic fastener assembly from the surrounding vicinity of the metallic fastener assembly positioned outside of the cap member. Surrounding vicinities within an aircraft which would need electrical transmission isolation from a metallic fastener assembly include areas such as a fuel tank, areas which contain sensitive electronic equipment or areas which could otherwise be adversely affected by a transmission from an EME or lightning strike event such as experienced by an aircraft.

A metallic fastener assembly, in this example, could include a threaded stud which includes at one end a nut or could include a threaded bolt which at one end includes a head. In employing a threaded stud, the threaded stud is extended through the structure(s) and a nut is positioned onto the threaded stud on one side of the structure(s) to which the metallic fastener assembly is to be secured and a nut member with threads compatible to the threads of the threaded stud is engaged to the threaded stud on an opposing second side of the structure(s), the side in which the cap system to be described herein will be positioned. Washer(s) may be positioned between the nut member and the structure(s). With respect to employing a threaded bolt, the threaded bolt is extended through the structure(s) with the head of the threaded bolt positioned on one side of a structure(s) to which the metallic fastener assembly is to be secured and a nut member with threads compatible to the threads of the threaded bolt is engaged onto the bolt on an opposing second side of the structure(s), the side in which the cap system to be described herein will be positioned. Washer(s) may be positioned between the nut member and the structure(s). With the tightening of the nut member on the threaded stud or on the threaded bolt in a direction toward the structure(s) a compressive force is applied to the structure(s) positioned between the nut (not shown) and the nut member with respect to the threaded stud or is applied to the structure(s) positioned between the head (not shown) and the nut member with respect to the threaded bolt. With the compressive force applied with the nut member on one of a threaded stud or threaded bolt of the metallic fastener assembly, the metallic fastener assembly is in a secured position with respect to the structure. With the metallic fastener assembly in a secured position with respect to the structure and with a cap member of the cap system enclosing the threaded stud or the threaded bolt which extends from the structure along with the nut member and in addition any washer(s) which may be used in association with the nut member, the cap member at the same time will secure to the metallic fastener assembly and the cap member will be positioned against the structure.

In referring to FIG. 1, in this example, an end portion 10 of metallic fastener assembly 11 is shown projecting from surface 12 of structure 14. Structure 14 is shown schematically wherein structure 14 may include one or more components to which metallic fastener assembly 11 is secured. Metallic fastener assembly 11 in this example includes threaded stud or bolt 16 which has a nut (not shown) or head (not shown) positioned beneath structure 14. Threaded stud or threaded bolt 16 has threads 18, and in this example, metallic fastener assembly 11 includes washer 20 which is positioned surrounding threaded stud or threaded bolt 16 and abuts surface 12 of structure 14. Metallic fastener assembly 11 further includes nut member 22 which has threads 24 positioned within nut member 22 which are compatible to engage with threads 18 of threaded stud or threaded bolt 16 wherein threaded stud or threaded bolt 16 extends through structure 14. Threads 24 of nut member 22 can engage threads 18 of threaded stud or threaded bolt 16 and be tightened down resulting in exerting a compressive force with respect to structure 14 with structure 14 positioned between nut member 22 and nut (not shown) or head (not shown) of threaded stud or threaded bolt 16, respectively, of metallic fastener assembly 11 obtaining a secured position with respect to structure 14. In this example, washer 20 is positioned between nut member 22 and structure 14.

Figure 2:
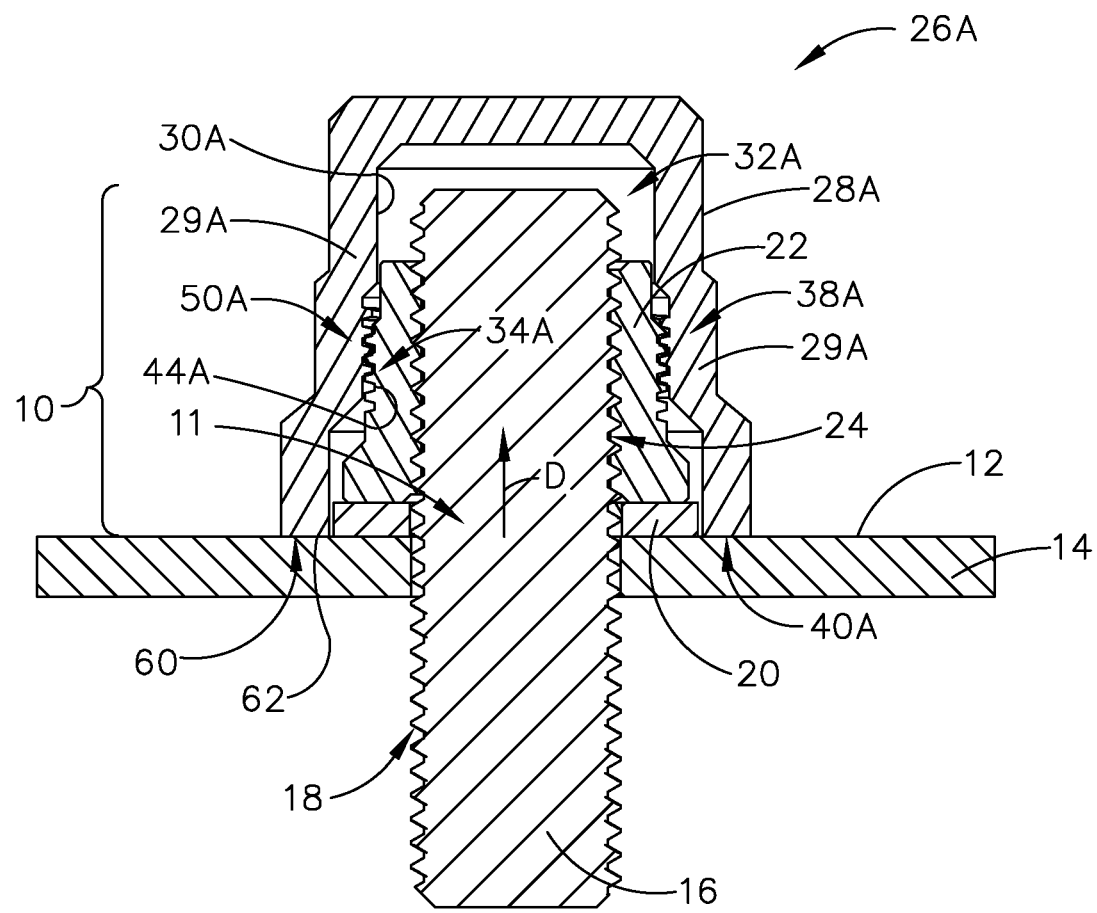
FIG. 2 is a cross section view along line 2-2 of FIG. 1 of the first embodiment of the cap system assembled.
Figure 3:
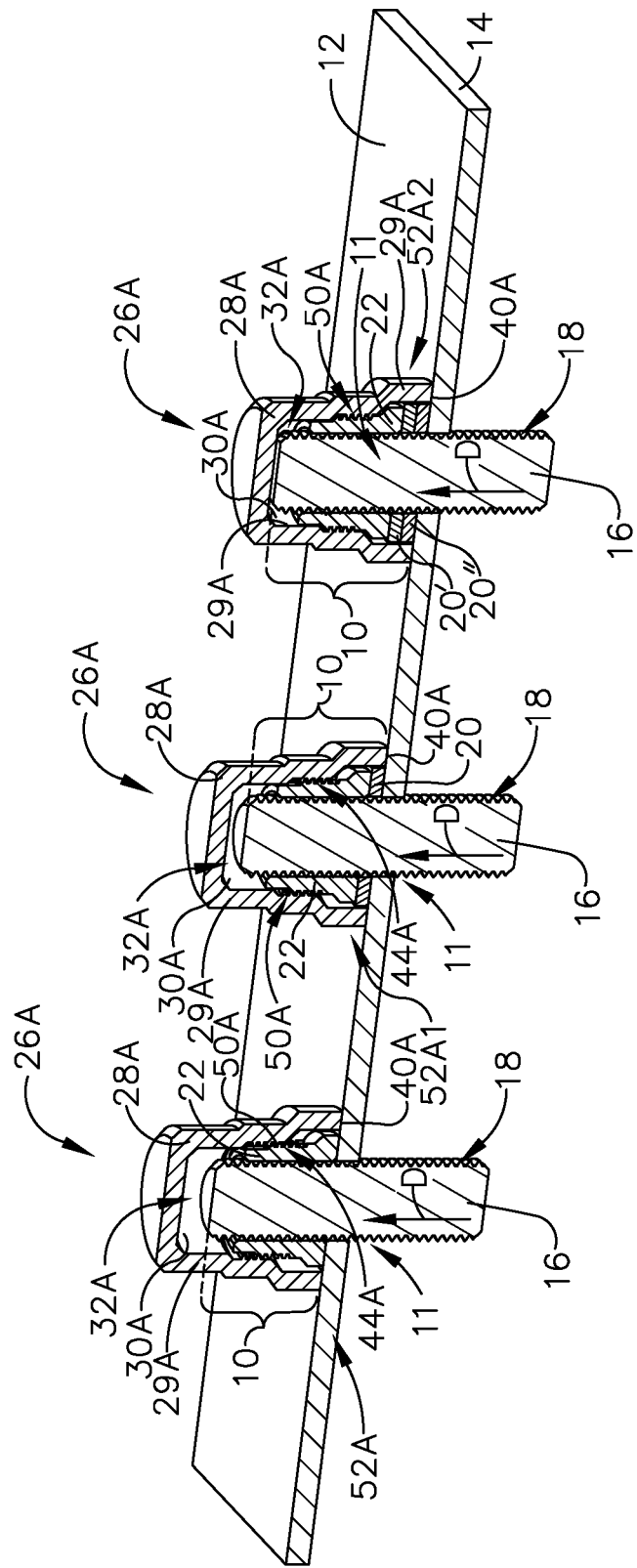
FIG. 3 is a perspective cross section view of employment of the first embodiment of the cap system of FIG. 1 utilizing different example configurations of the metallic fastener assembly wherein the first example has a nut member of the metallic fastener assembly positioned on a surface of the structure; the second example has the nut member of the metallic fastener assembly positioned on one washer; and the third example has the nut member of the metallic fastener assembly positioned on two washers.
Figure 4:
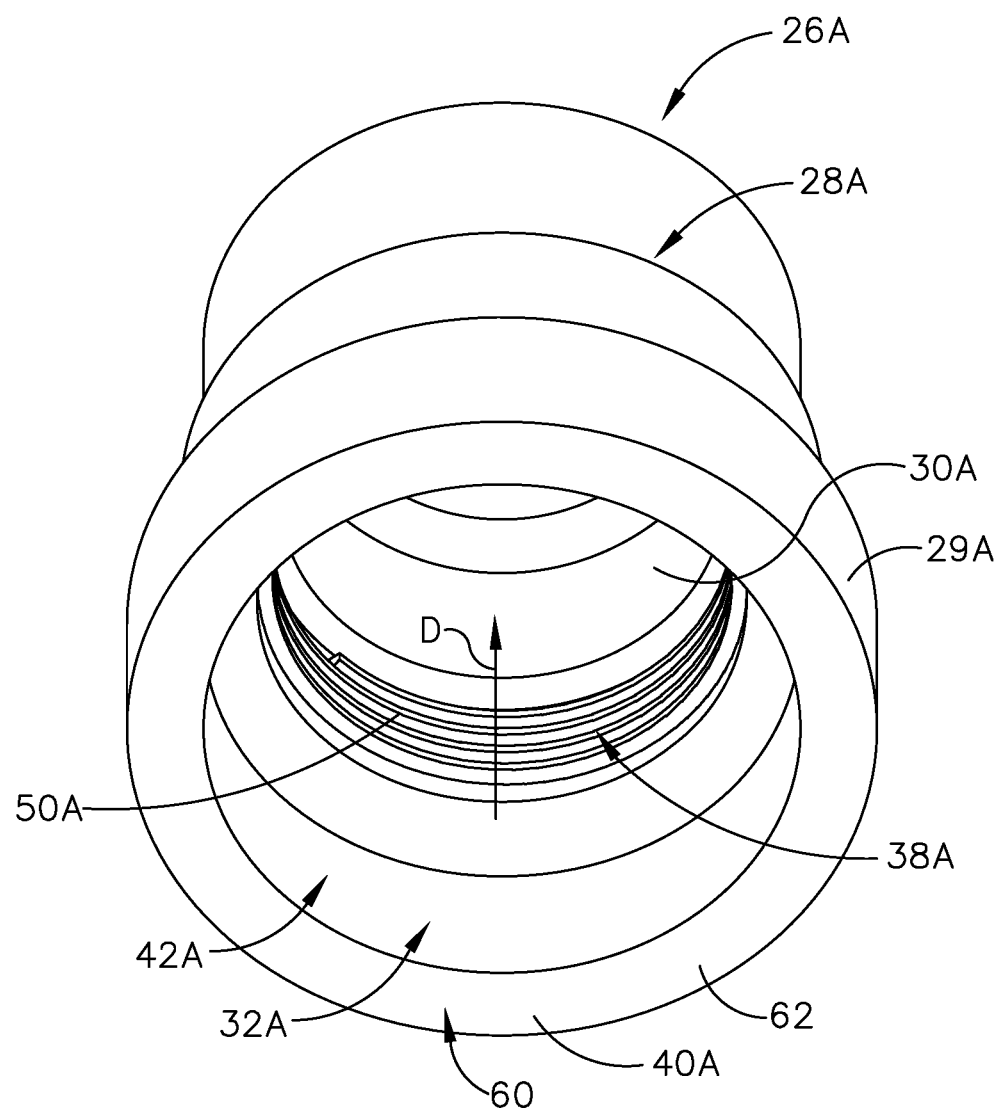
FIG. 4 is an enlarged bottom perspective view of the cap member of FIG. 1 showing a first example of the end of the cap member.

In FIG. 1, first embodiment of cap system 26A is shown having cap member 28A. As mentioned earlier cap member 28A will be constructed of a nonconductive material such as one of a polymer, thermoset or other nonconductive materials. Cap member 28A has sidewall 29A having inner surface 30A, as seen in FIGS. 2-4, which defines cavity 32A which is dimensioned to receive nut member 22. First securement mechanism 34A, as seen in FIG. 1, is positioned about periphery 36A of nut member 22. Inner surface 30A of cap member 28A defines second securement mechanism 38A, as seen in FIG. 4, which is complementary configured to engage first securement mechanism 34A positioned about periphery 36A of nut member 22. End 40A of sidewall 29A of cap member 28A defines opening 42A which provides nut member 22 to have access into cavity 32A.

As seen in FIG. 1, first securement mechanism 34A includes threads 44A which are interrupted or non-continuous as threads 44A extend about periphery 36A of nut member 22. Threads 44A which are interrupted are defined by a plurality of ridge members 46A positioned on nut member 22. Ridge members 46A extend in radial direction 48A away from nut member 22. Adjacent ridge members 46A of the plurality of ridge members 46A are spaced apart about nut member 22 wherein each ridge member 46A is equally spaced apart from adjacent ridge members 46A. This configuration of equally spaced apart ridge members 46A permit the installer to use a conventional socket wrench tool to engage nut member 22 and tighten nut member 22 onto threaded stud or threaded bolt 16 relative to structure 14 without imparting damage to threads 44A positioned on ridge members 46A.

Second securement mechanism 38A includes threads 50A defined by inner surface 30A of sidewall 29A of cap member 28A, as seen in FIG. 4. Threads 50A extend about inner surface 30A of cap member 28A and extend in a direction D away from end 40A of sidewall 29A of cap member 28A. As will be discussed further below, with nut member 22 and threaded stud or threaded bolt 16 in a secured position with respect to structure 14 and with threads 50A engaging at least a portion of the interrupted threads 44A of nut member 22, end 40A of cap member 28A is positioned against structure 14 enclosing and securing to end portion 10 of metallic fastener assembly 11. With threads 50A extending in direction D, threads 50A extend toward higher elevations with respect to surface 12 with end 40A abutting surface 12 as shown in FIG. 3. Threads 50A can accommodate and engage threads 44A of nut member 22 as threads 44A may differ in elevation position relative to surface 12 as will be shown and discussed with respect to FIG. 3, thereby ensuring securement of cap member 28A to end portion 10 of metallic fastener assembly 11 and end 40A abutting surface 12 enclosing end portion 10.

In FIG. 3, first example 52A of end portion 10 of metallic fastener assembly 11 extending in this example above surface 12 of structure 14 is seen wherein first embodiment of cap system 26A is shown enclosing and securing to end portion 10 of metallic fastener assembly 11. In first example 52A, nut member 22 is secured to threads 18 of threaded stud or threaded bolt 16 and directly abuts surface 12 (without a washer) and threads 44A of nut member 22 are engaged to threads 50A wherein threads 44A are positioned above surface 12 at an elevation profile lesser than that of threads 44A in second example 52A1.

In second example 52A1, in FIG. 3, first embodiment of cap system 26A encloses and secures to end portion 10 of metallic fastener assembly 11 positioned extending in this example above surface 12. In second example 52A1, nut member 22 is secured to threads 18 of threaded stud or threaded bolt 16 and is positioned on washer 20 which positions threads 44A, which are engaged to threads 50A of cap member 28A, above surface 12 at a higher elevation profile than that of threads 44A of first example 52A. Threads 50A of cap member 28A extend in direction D as seen in FIG. 4 permitting threads 44A of nut member 22 to be engaged to threads 50A in both the first example 52A and second example 52A1 with end 40A of sidewall 29A of cap member 28A abutting surface 12 of structure 14. As a result, cap member 28A encloses end portion 10 of metallic fastener assembly 11 and secures to end portion 10 of metallic fastener assembly 11 regardless of the difference in elevation profile of threads 44A with respect to surface 12.

This similarly is the case with respect to third example 52A2, in FIG. 3, wherein nut member 22 is secured to threads 18 of threaded stud or threaded bolt 16 and is positioned on washer 20' and washer 20" raising the elevation profile of threads 44A in this third example 52A2 to even a higher elevation profile above surface 12 of structure 14 than second example 52A1. Again, threads 50A extending in direction D permit threads 44A of nut member 22 to be engaged to threads 50A in third example 52A2 with end 40A abutting surface 12 providing a secured enclosure of end portion 10 of metallic fastener assembly 11 with cap member 28A.

Thus, with the installer having tightened nut member 22 onto threads 18 of threaded stud or threaded bolt 16 into a secured position relative to structure 14, the installer can then position first embodiment of cap member 28A to have threads 44A of nut member 22 engage threads 50A of cap member 28A. The installer can then turn and tighten cap member 28A, with threads 44A and 50A engaged, until end 40A abuts surface 12. Cap member 28A is then secured to surface 12 and secured to metallic fastener assembly 11 enclosing end portion 10 of metallic fastener assembly 11. As explained above, with threads 50A extending in direction D, threads 44A of nut member 22 positioned at different elevation profiles above surface 12 can engage and reliably secure to threads 50A thereby securing cap member 28A to end portion 10 of metallic fastener assembly 11 and with end 40A abutting surface 12 cap member 28A securely encloses end portion 10 of metallic fastener assembly 11.

Figure 5:
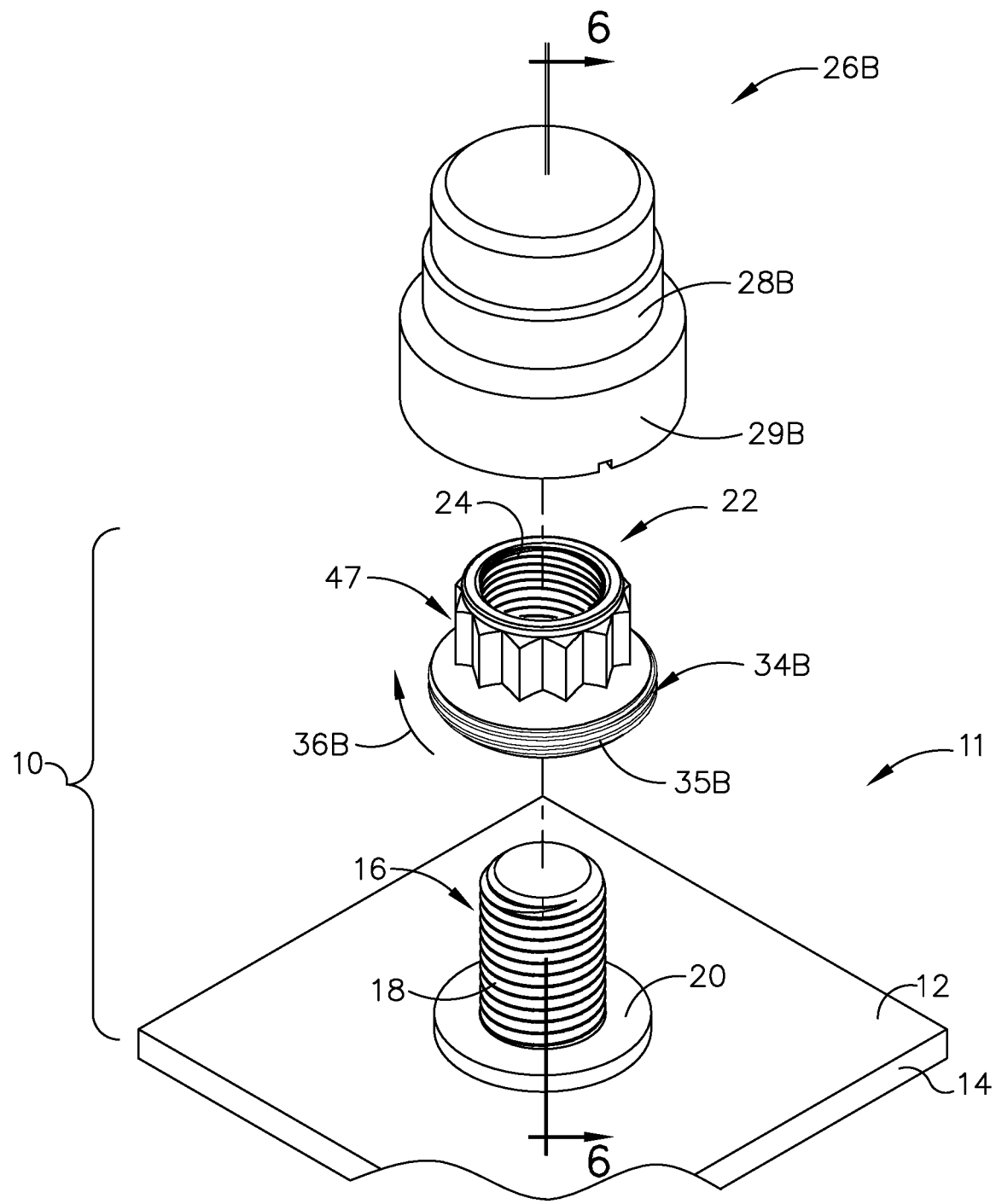
FIG. 5 is an exploded perspective view of a second embodiment of the cap system for enclosing an end portion of the metallic fastener assembly extending from the structure.
Figure 6:
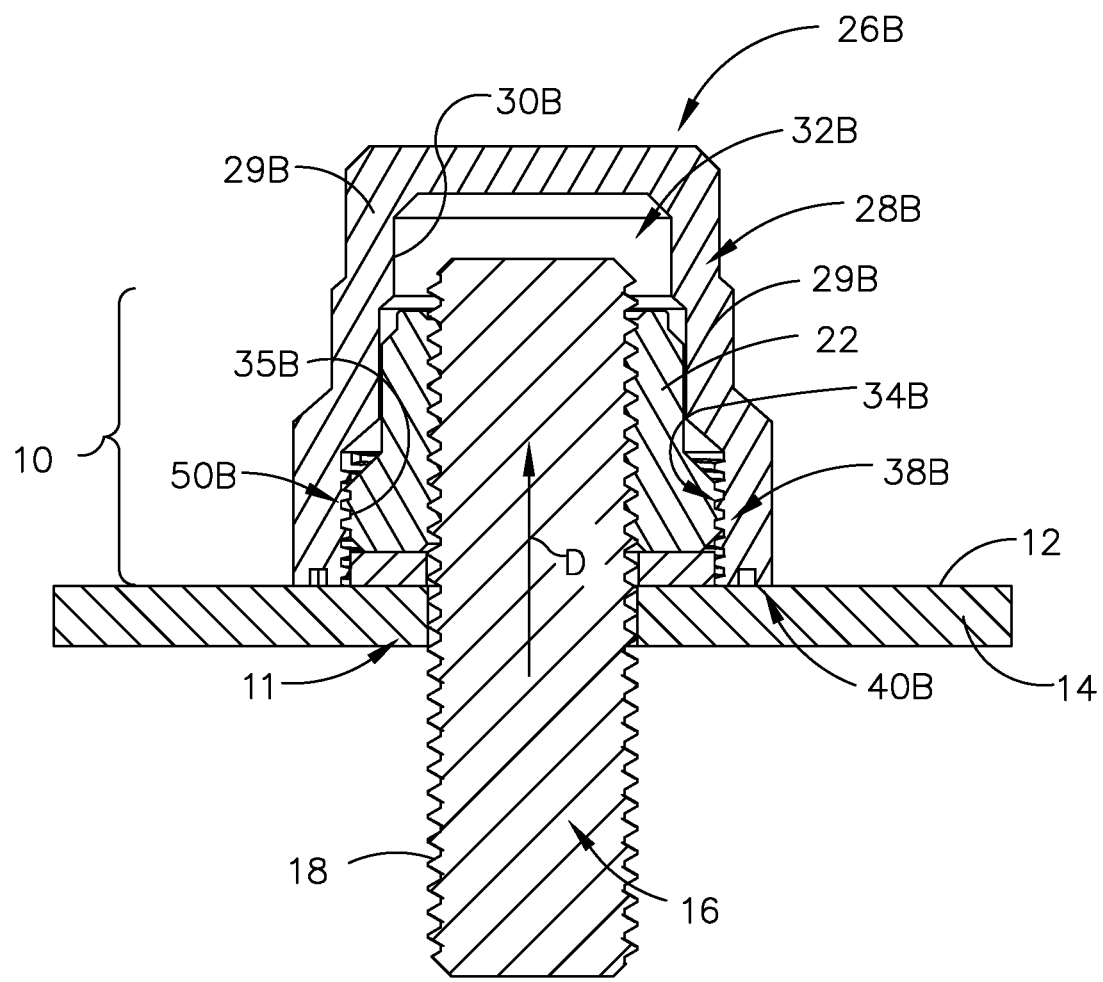
FIG. 6 is a cross section view along line 6-6 of FIG. 5 of the second embodiment of the cap system assembled.
Figure 7:
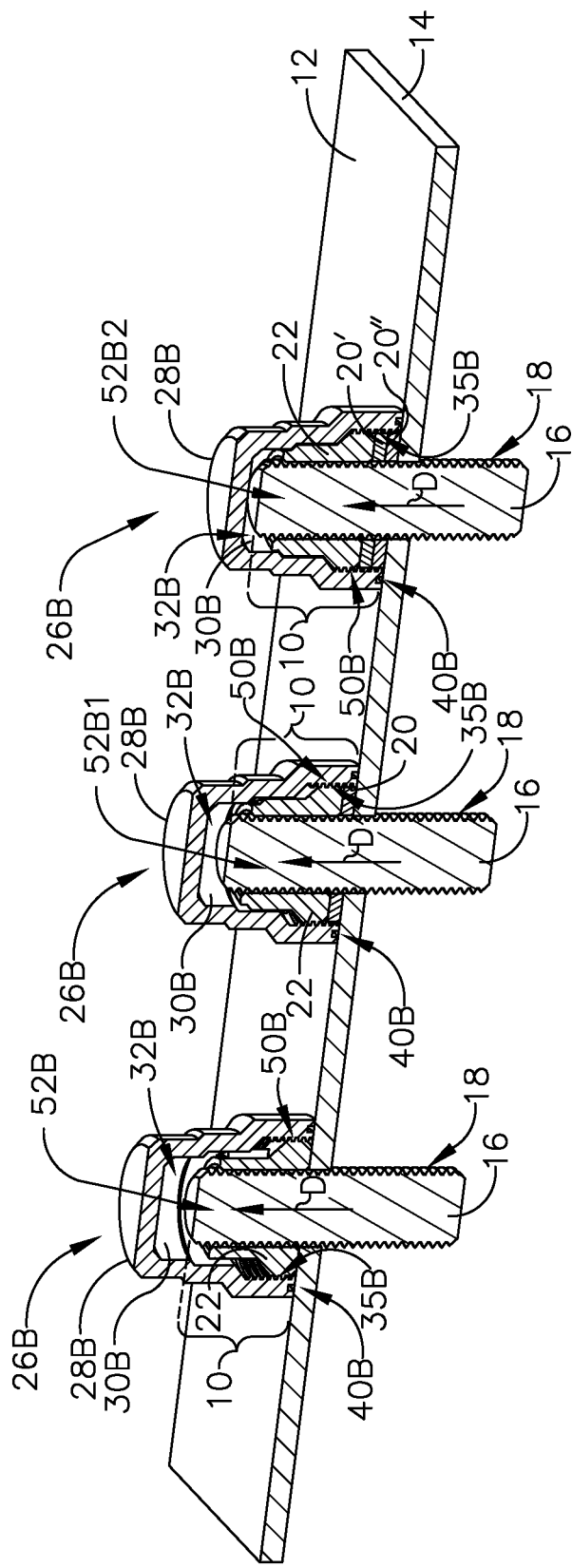
FIG. 7 is a perspective cross section view of employment of the second embodiment of the cap system of FIG. 5 utilizing different example configurations of the metallic fastener assembly wherein the first example has a nut member of the metallic fastener assembly positioned on a surface of the structure; the second example has the nut member of the metallic fastener assembly positioned on one washer; and the third example has the nut member of the metallic fastener assembly positioned on two washers.
Figure 8:
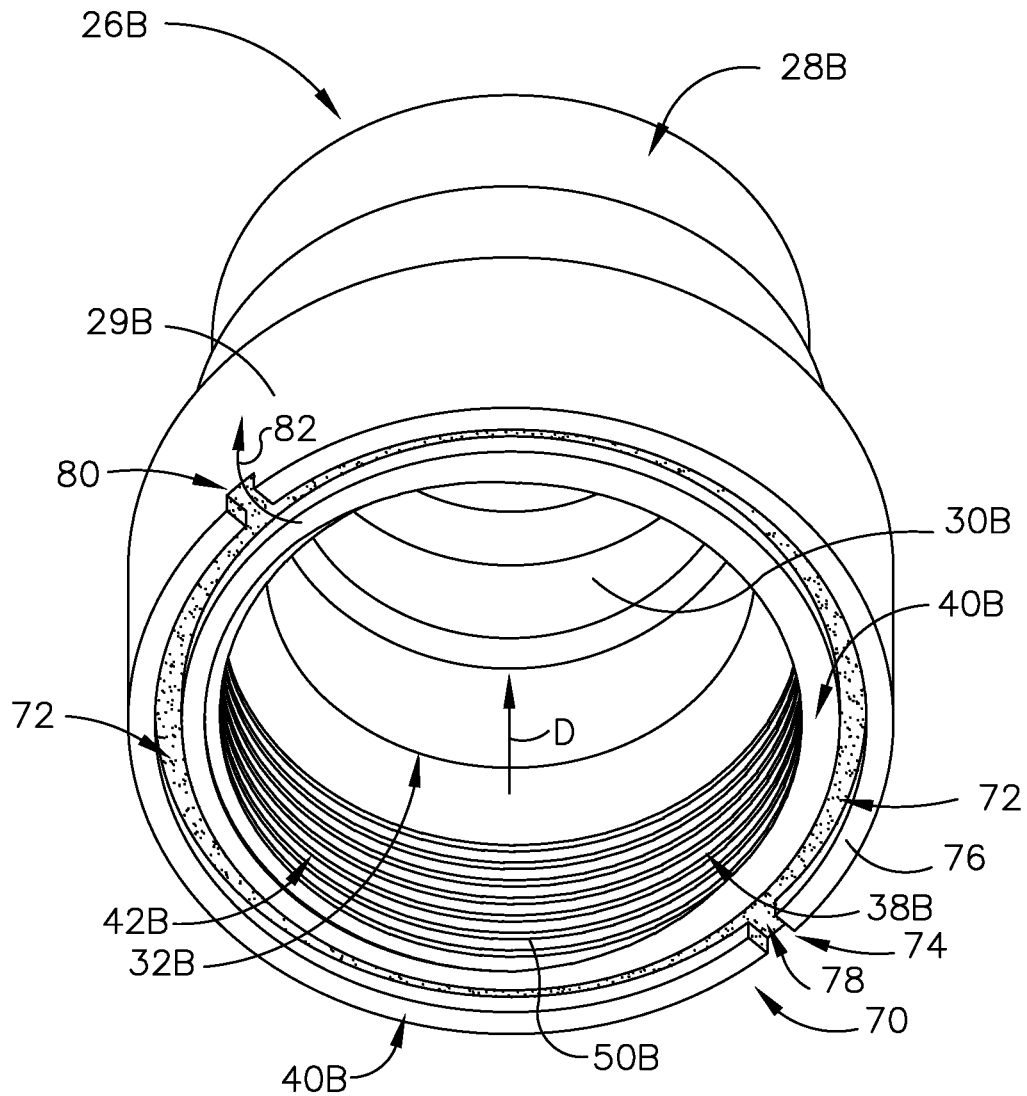
FIG. 8 is an enlarged bottom perspective view of the cap member of FIG. 5 showing a second example of the end of the cap member.

In referring to FIG. 5, second embodiment of cap system 26B is shown having cap member 28B. As mentioned earlier cap member 28B will be constructed of a nonconductive material such as one of a polymer, thermoset or other nonconductive material. Cap member 28B has sidewall 29B having an inner surface 30B, as seen in FIGS. 6-8, which defines cavity 32B which is dimensioned to receive nut member 22. First securement mechanism 34B as seen in FIG. 5 includes continuous threads 35B positioned to extend uninterrupted about nut member 22. Inner surface 30B, as seen in FIG. 8, defines second securement mechanism 38B which is complementary configured to engage first securement mechanism 34B positioned about periphery 36B of nut member 22. End 40B of sidewall 29B of cap member 28B defines opening 42B which provides nut member 22 to have access into cavity 32B.

As seen in FIG. 5, first securement mechanism 34B includes continuous threads 35B which extend uninterrupted about periphery 36B of nut member 22. Continuous threads 35B are positioned in a lower portion of nut member 22 so as not to interfere with spaced apart plurality of ridges configuration 47 positioned in an upper portion of nut member 22. Plurality of ridges configuration 47 is compatible with a standard socket wrench, in this example, for securing nut member 22 on threaded stud or threaded bolt 16 in a secured position with respect to structure 14 without imparting damage to continuous threads 35B.

Second securement mechanism 38B includes threads 50B defined by inner surface 30B of sidewall 29B of cap member 28B, as seen in FIG. 8. Threads 50B extend about inner surface 30B of sidewall 29B of cap member 28B and extend in a direction D away from end 40B of sidewall 29B of cap member 28B. As will be discussed further below, with nut member 22 and threaded stud or threaded bolt 16 in a secured position in relationship to structure 14 and with threads 50B engaging at least a portion of continuous threads 35B of nut member 22, end 40B is positioned against structure 14 enclosing end portion 10 of metallic fastener assembly 11. With threads 50B extending in direction D, threads 50B extend toward higher elevations above surface 12 of structure 14 with end 40B in abutting relationship with surface 12 of structure 14, as shown in FIG. 7. Threads 50B can accommodate and engage continuous threads 35B of nut member 22 with continuous threads 35B positioned at different elevation profiles above surface 12 as seen in FIG. 7.

In FIG. 7, first example 52B of end portion 10 of metallic fastener assembly 11 extending in this example above surface 12 of structure 14 is seen wherein second embodiment of cap system 26B is shown enclosing and securing to end portion 10 of metallic fastener assembly 11. In first example 52B, nut member 22 is secured to threads 18 of threaded stud or threaded bolt 16 and directly abuts surface 12 (without a washer) and continuous threads 35B of nut member 22 are engaged to threads 50B wherein continuous threads 35B are positioned above surface 12 at an elevation profile lesser than continuous threads 35B of second example 52B1.

In second example 52B1, in FIG. 7.second embodiment of cap system 26B encloses and secures to end portion 10 of metallic fastener assembly 11 positioned extending above surface 12. In second example 52B1, nut member 22 is secured to threads 18 of threaded stud or threaded bolt 16 and is positioned on washer 20 which positions continuous threads 35B above surface 12 at a higher elevation profile than that of continuous threads 35B of first example 52B. Threads 50B of cap member 28B extend in direction D, as seen in FIG. 8, permitting continuous threads 35B of nut member 22 to be engaged to threads 50B in both the first example 52B and second example 52B1 with end 40B of sidewall 29B of cap member 28B abutting surface 12 of structure 14. As a result, cap member 28B encloses end portion 10 of metallic fastener assembly 11 regardless of the difference in elevation profile of continuous threads 35B with respect to surface 12.

This similarly is the case with respect to third example 52B2, in FIG. 7, wherein nut member 22 is secured to threads 18 of threaded stud or threaded bolt 16 and is positioned on washer 20' and washer 20" raising the elevation profile of continuous threads 35B in this third example 52B2 to even a higher elevation profile above surface 12 of structure 14 than second example 52B1. Again, threads 50B extending in direction D permit continuous threads 35B of nut member 22 to be engaged in third example 52B2 with end 40B abutting surface 12 providing a secured enclosure of end portion 10 of metallic fastener assembly 11 with cap member 28B.

Thus, with the installer having tightened nut member 22 on threads 18 of threaded stud or threaded bolt 16 into a secured position relative to structure 14, the installer can then position second embodiment of cap member 28B to have continuous threads 35B of nut member 22 engage threads 50B of cap member 28B. The installer can then turn and tighten cap member 28B, with continuous threads 35B and threads 50B engaged, until end 40B abuts surface 12. Cap member 28B is then secured to surface 12 of structure 14 enclosing end portion 10 of metallic fastener assembly 11. As explained above, with threads 50B extending in direction D, continuous threads 35B of nut member 22 positioned at different elevation profiles above surface 12 can engage and reliably secure to threads 50B thereby securing cap member 28B to end portion 10 of metallic fastener assembly 11 and with end 40B abutting surface 12 cap member 28B securely encloses end portion 10 of metallic fastener assembly 11.

Figure 9:
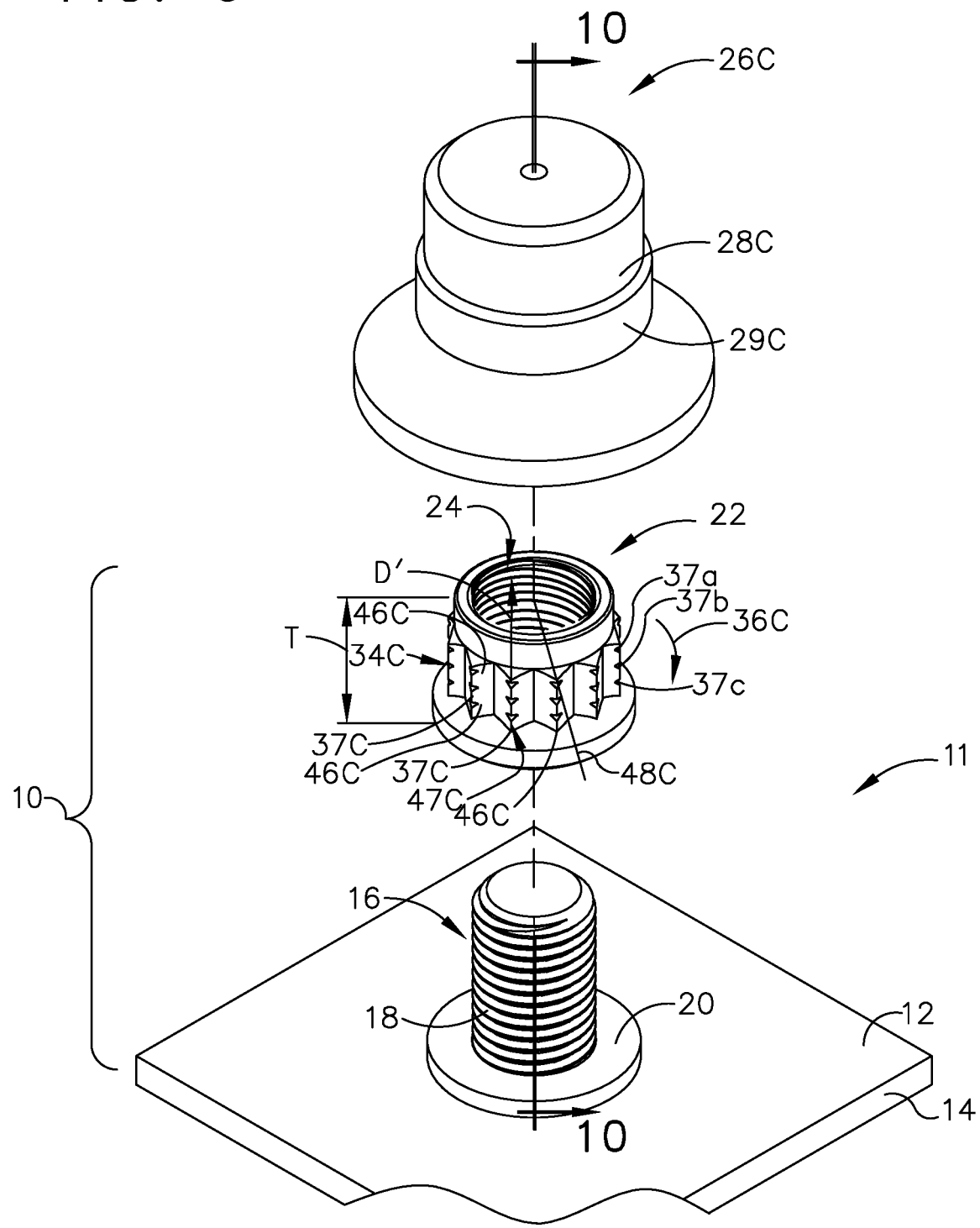
FIG. 9 is an exploded perspective view of a third embodiment of the cap system for enclosing an end portion of a metallic fastener assembly extending from a structure.
Figure 10:
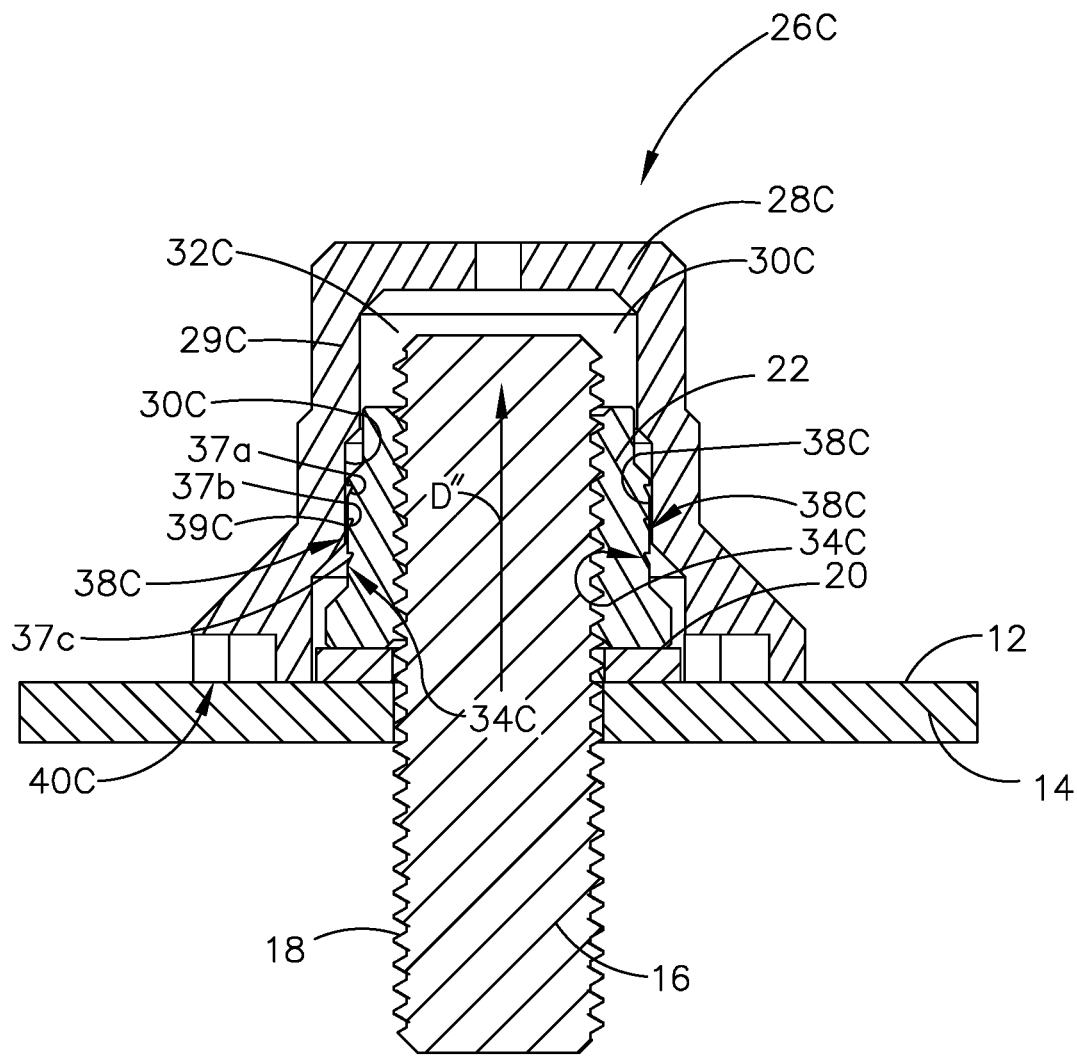
FIG. 10 is a cross section view along line 10-10 of FIG. 9 of the third embodiment of the cap system assembled.
Figure 11:
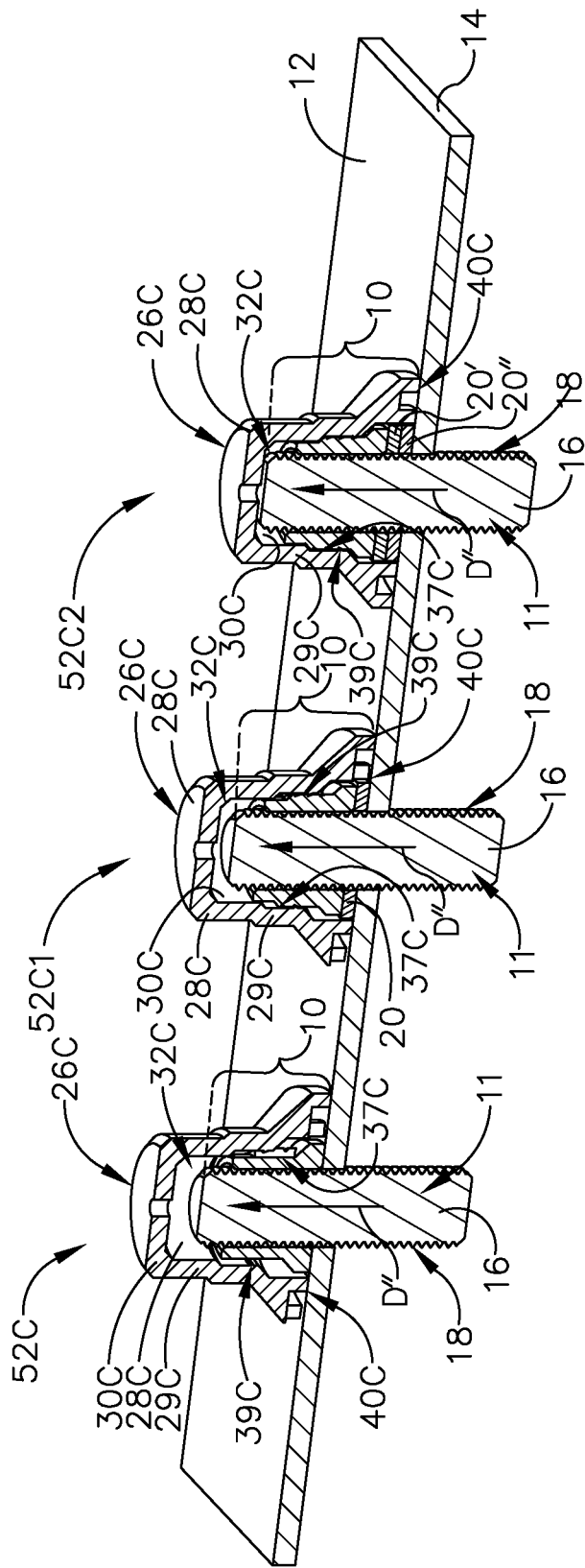
FIG. 11 is a perspective cross section view schematic employment of the third embodiment of the cap system of FIG. 9 utilizing different example configurations of the metallic faster assembly wherein the first example has a nut member of the metallic fastener assembly positioned on a surface of the structure; the second example has the nut member of the metallic fastener assembly positioned on one washer of the metallic fastener assembly; and the third example has the nut member of the metallic fastener assembly positioned on two washers.
Figure 12:
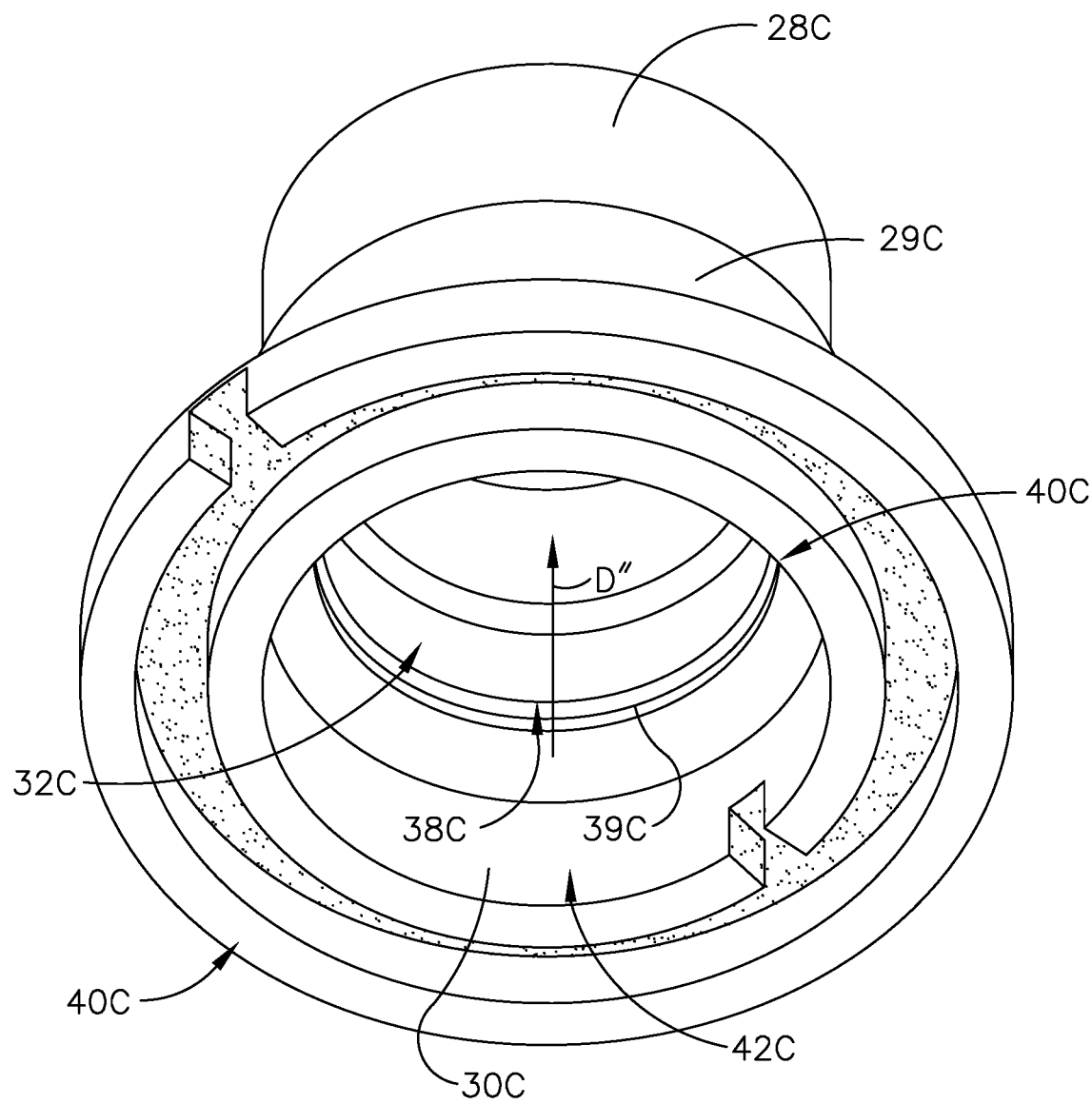
FIG. 12 is an enlarged bottom perspective view of the cap member of FIG.; 9 showing a third example of the end of the cap member.

In referring to FIG. 9, third embodiment of cap system 26C is shown having cap member 28C. As mentioned earlier cap member 28C will be constructed of a nonconductive material such as one of a polymer, thermoset or other nonconductive material. Cap member 28C has sidewall 29C having an inner surface 30C, as seen in FIGS. 10-12, which defines cavity 32C which is dimensioned to receive nut member 22. First securement 34C as seen in FIG. 9 is positioned about periphery 36C of nut member 22. Inner surface 30C of cap member 28C defines second securement mechanism 38C, as seen in FIG. 8, which is complementary configured to engage first securement mechanism 34C positioned about periphery 36C of nut member 22. End 40C of sidewall 29C of cap member 28C defines opening 42C which provides nut member 22 to have access into cavity 32C.

As seen in FIG. 9, first securement mechanism 34C includes a plurality of grooves 37C positioned spaced apart about periphery 36C of nut member 22. Plurality of ridge members 46C which extend in a radial direction 48C away from nut member 22 define a plurality of grooves 37C. Adjacent ridge members 46C are spaced apart about nut member 22. Each of the plurality of ridge members 46C is equally spaced apart from adjacent ridge members 46C. A portion of plurality of grooves 37C are positioned spaced apart on each ridge member 46C aligned in a row 47C, as seen in FIG. 9. Rows 47C of a portion of the plurality of grooves 37C are positioned in this example on each of ridge members 46C positioned about nut member 22. Rows 47C extend in direction D' which extends in the direction of thickness T of nut member 22. This configuration of spaced apart ridge members 46C permit the installer to use a conventional socket wrench tool to engage nut member 22 and tighten nut member 22 onto threaded stud or threaded bolt 16 relative to structure 14 without imparting damage to portions of plurality of grooves 37C positioned on ridge members 46C.

Second securement mechanism 38C, as seen in FIGS. 10 and 12, which includes at least one annular ledge 39C defined by inner surface 30C of sidewall 29C of cap member 28C. At least one annular ledge 39C is positioned about inner surface 30C of cap member 28C. At least one annular ledge 39C is positioned spaced away in a direction D" from end 40C of cap member 28C such that with nut member 22 and threaded stud or threaded bolt 16 of metallic fastener assembly 11 in a secured position with respect to structure 14 and with at least one annular ledge 39C engaging at least a portion of the plurality of grooves 37C, end 40C of cap member 28C is positioned against structure 14. Nut member 22 is constructed, in this example, with metallic material and is less flexible than at least one annular ledge 39C constructed of a more flexible material such as a polymer or thermoset material wherein as the installer pushes down on cap member 28C over end portion 10 of metallic fastener assembly 11 at least one annular ledge 39C will flex against nut member 22. In this example, at least one annular ledge 39C will flex back into plurality of grooves 37C as grooves 37C come into alignment with at least one annular ledge 39C. Once end 40C of cap member 28C abuts against surface 12 of structure 14 and at least one annular ledge 39C is in alignment with plurality of grooves 37C, cap member 28C is secured to end portion 10 of metallic fastener assembly 11 and against surface 12.

In FIG. 11, a schematic first example 52C of end portion 10 of metallic fastener assembly 11 extending above surface 12 of structure 14 is seen wherein third embodiment of cap system 26C is shown enclosing and securing to end portion 10 of metallic fastener assembly 11. In referring to first example 52C, nut member 22 is secured to one of threaded stud or threaded bolt 16 directly abuts surface 12 (without a washer) placing grooves 37C, as seen in FIG. 9, on each row 47C at predetermined elevations above surface 12 of structure 14. For example, as seen in FIG. 9 grooves 37a, 37b and 37c will be positioned at predetermined elevations above surface 12 with nut member 22, in this first example 52C, abutting surface 12 of structure 14. At least one annular ledge 39C of cap member 28C, as seen in FIG. 12, can be positioned spaced away in direction D'" from end 40C, such that with end 40C abutting surface 12, at least one annular ledge 39C engages grooves 37C at an elevation above surface 12 which are positioned for example as groove 37a.

In referring to second schematic example 52C1, nut member 22 is secured to one of threaded stud or threaded bolt 16 and is positioned on washer 20 positioning plurality of grooves 37C at a higher elevation profile above surface 12 than positioned in first example 52C. In this second schematic example 52C1, at least one annular ledge 39C of cap member 28C, as used in first example 52C, engages grooves 37C at an elevation above surface 12 which are positioned as groove 37b, for example as seen in FIGS. 9 and 10, with end 40C abutting surface 12 of structure 14.

In referring to third schematic example 52C2, nut member 22 is secured to one of threaded stud or threaded bolt 16 and is positioned on washer 20' and washer 20" positioning plurality of grooves 37C at a higher elevation profile above surface 12 than positioned in second example 52C1. In third schematic example 52C2, at least one annular ledge 39C of cap member 28C, as used in first example 52C and second example 52C1, engages grooves 37C at an elevation above surface 12 which are positioned as groove 37c, for example as seen in FIGS. 9 and 10, with end 40C abutting surface 12 of structure 14. In these examples, at least one annular ledge 39C can be positioned within cap member 28C spaced away from end 40C such that with nut member 22 positioned on surface 12 or on washer 20 or on washer 20' and washer 20", at least one annular ledge 39C is positioned within cap member 28C to engage grooves 37C such as 37a, 37b or 37c, as described above, with end 40C abutting surface 12 of structure 14.

Thus, in this third embodiment of cap system 26C, the installer having tightened nut member 22 on threaded stud or threaded bolt 16 into a secured position relative to structure 14, the installer can then position third embodiment of cap member 28C over nut member 22 and push cap member 28C over nut member 22 flexing at least one annular ledge 39C of inner surface 30C of cap member 28C until cap member 28C abuts surface 12 of structure 14 and plurality of grooves 37C of nut member 22 engage at least one annular ledge 39C. Cap member 28C is then secured to end portion 10 and abuts surface 12 of structure 14 enclosing end portion 10 of metallic fastener assembly 11. As explained above, with at least one annular ledge 39C spaced away extending in direction D'" from end 40C of cap member 28C, plurality of grooves 37C of nut member 22 positioned at different predetermined elevation profiles above surface 12, such as in this example 37a, 37b and 37c, can engage and reliably secure at least one annular ledge 39C securing cap member 28C to end portion 10 of metallic fastener assembly 11 with end 40C abutting surface 12 thereby securing to and enclosing end portion 10 of metallic fastener assembly 11.

Figure 13:
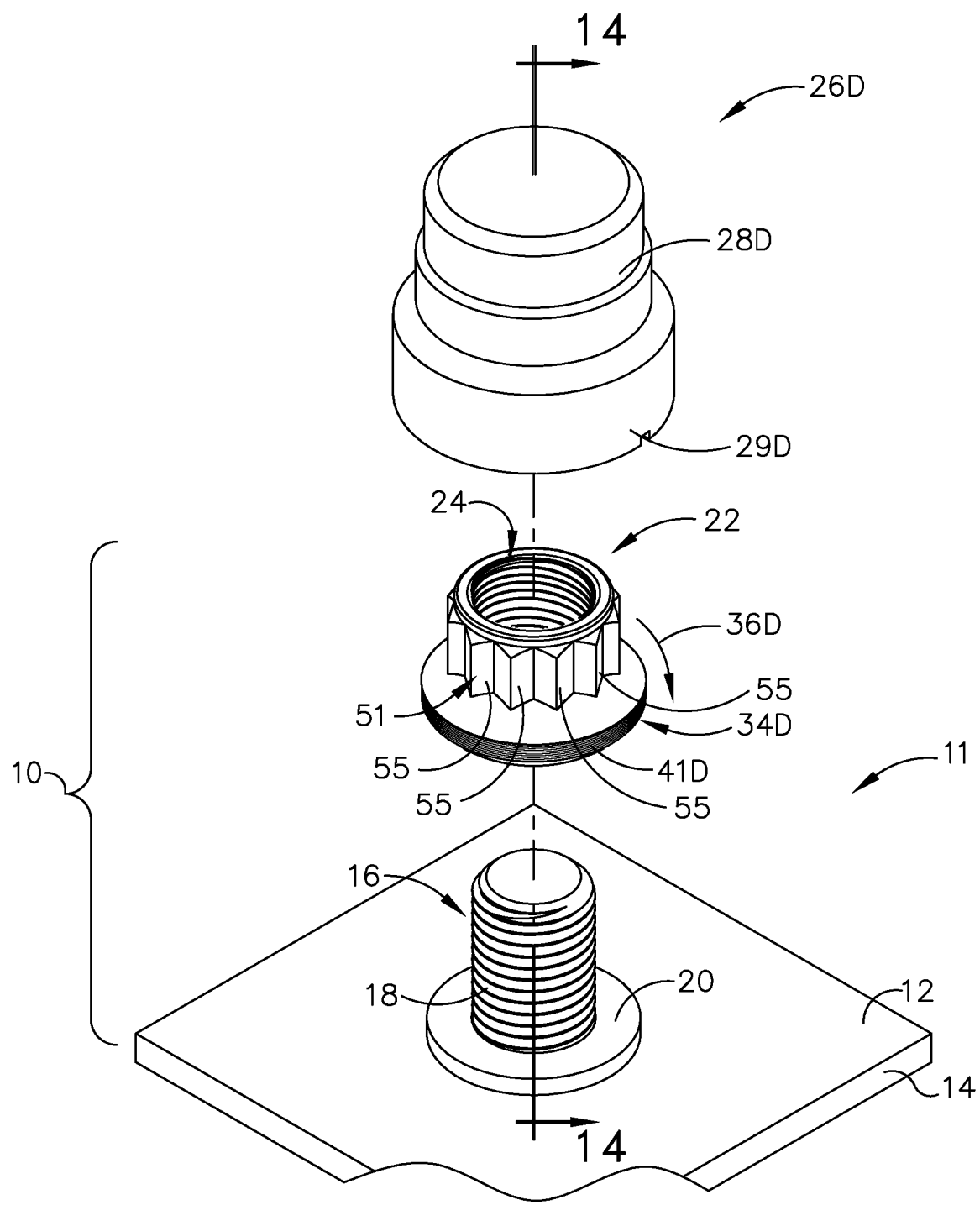
FIG. 13 is an exploded perspective view of a fourth embodiment of the cap system for covering a metallic fastener assembly extending from a structure.
Figure 14:
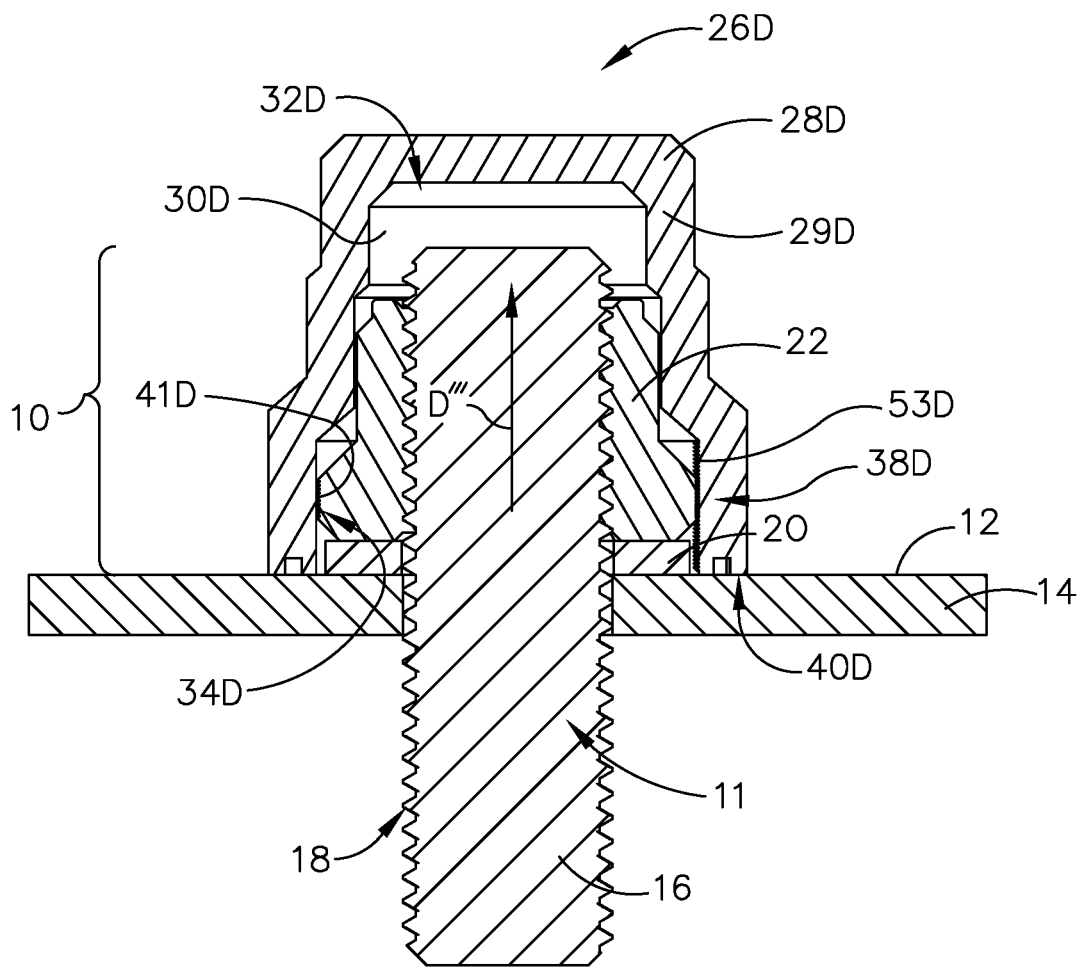
FIG. 14 is a cross section view along line 14-14 of FIG. 13 of the fourth embodiment of the cap system assembled.
Figure 15:
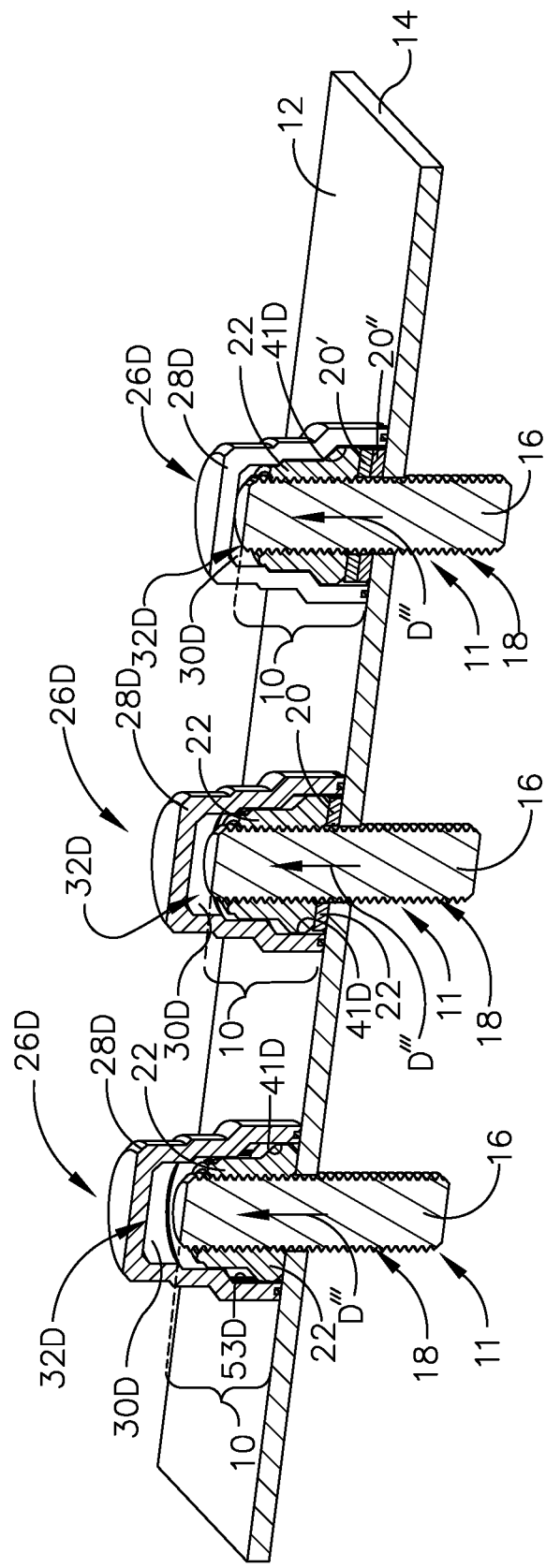
FIG. 15 is a perspective cross section view of employment of the cap system of the fourth embodiment of FIG. 13 utilizing different example configurations of the metallic fastener assembly wherein the first example has a nut member of the metallic fastener assembly positioned on a surface of the structure; the second example has the nut member of the metallic fastener assembly positioned on one washer; and the third example has the nut member of the metallic fastener assembly positioned on two washers.
Figure 16:
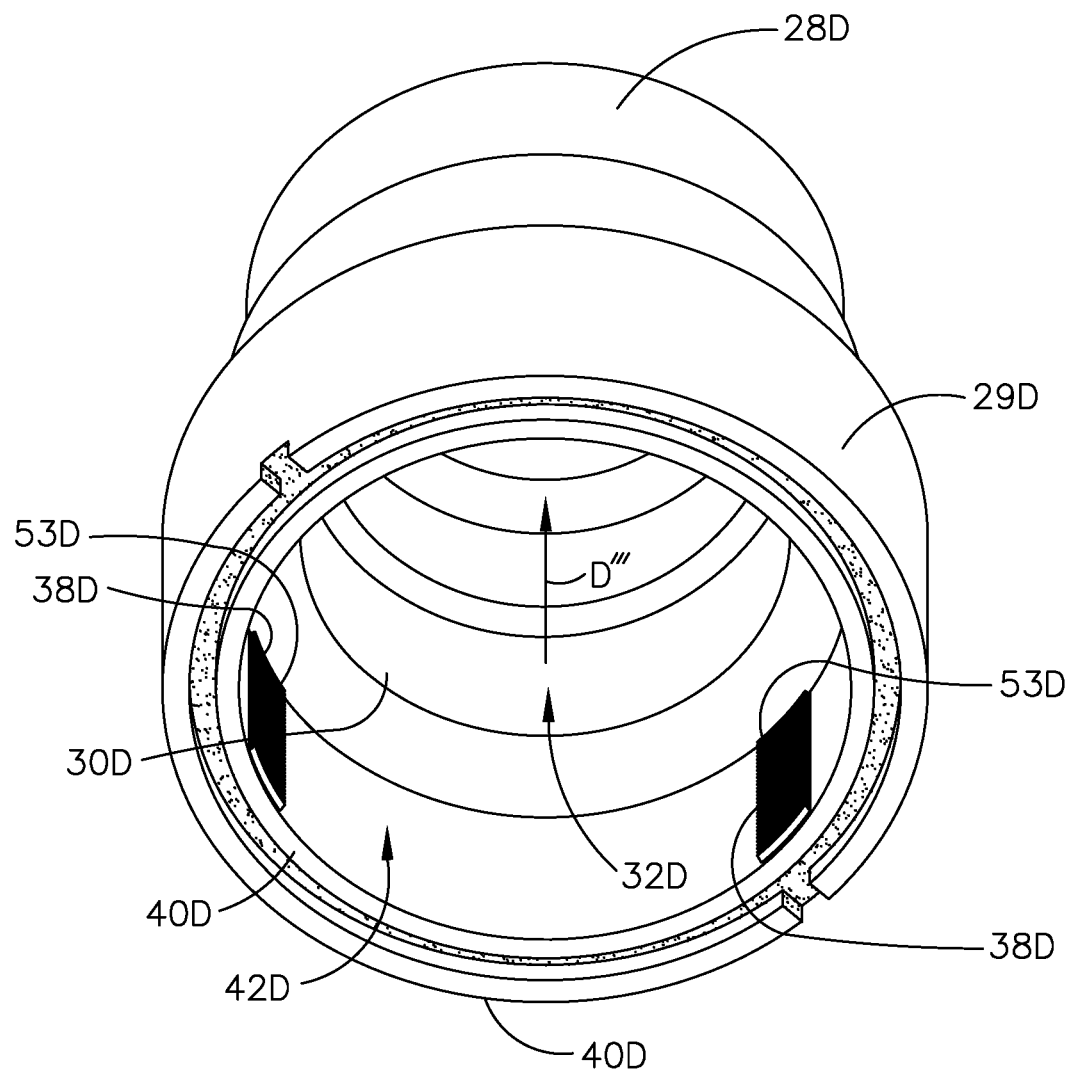
FIG. 16 is an enlarged perspective view of the cap member of the cap system of FIG. 13 showing the second example of the end of the cap member.

In referring to FIG. 13, fourth embodiment of cap system 26D is shown having cap member 28D. As mentioned earlier cap member 28D will be constructed of a nonconductive material such as one of a polymer, thermoset or other nonconductive material. Cap member 28D has sidewall 29D having an inner surface 30D, as seen in FIGS. 14-16 which defines cavity 32D which is dimensioned to receive nut member 22. First securement 34D as seen in FIG. 13 is positioned about periphery 36D of nut member 22. Inner surface 30D of cap member 28D defines second securement mechanism 38D, as seen in FIG. 16, which is complementary configured to engage first securement mechanism 34D positioned about periphery 36D of nut member 22. End 40D of sidewall 29D of cap member 28D defines opening 42D which provides nut member 22 to have access into cavity 32D.

As seen in FIG. 13, first securement mechanism 34D includes a plurality of continuous grooves 41D which extend about periphery 36D of nut member 22. Continuous grooves 41D are positioned in a lower portion of nut member 22 so as not to interfere with plurality of ridges configuration 51 positioned in an upper portion of nut member 22. Plurality of ridges configuration 51 is compatible with a standard socket wrench, in this example, for securing nut member 22 on threaded stud or threaded bolt 16 in a secured position with respect to structure 14 without imparting damage to continuous grooves 41D. Plurality of ridges configuration 51 extend in a radial direction away from nut member 22 as seen in FIG. 13, wherein adjacent ridge members 55 of the plurality of ridges configuration 51 are spaced about nut member 22 such that each ridge member 55 is equally spaced apart from an adjacent ridge member 55.

Second securement mechanism 38D, as seen in FIG. 16, which includes a plurality of teeth 53D positioned along inner surface 30D of sidewall 29D of cap member 28D. Plurality of teeth 53D are positioned about at least a portion of inner surface 30D of cap member 28D. Plurality of teeth 53D are positioned extending in a direction D'" along inner surface 30D of cap member 28D away from end 40D of cap member 28D such that with nut member 22 and threaded stud or threaded bolt 16 of metallic fastener assembly 11 in a secured position with respect to structure 14 and with at least a portion of plurality of teeth 53D engaging at least a portion of the plurality of continuous grooves 41D, end 40D of cap member 28D is positioned against structure 14. Nut member 22 is constructed, in this example, with metallic material and is less flexible than plurality of teeth 53D constructed of a more flexible material such as a polymer or thermoset material wherein as the installer pushes down on cap member 28D over end portion 10 of metallic fastener assembly 11 plurality of teeth 53D will flex against nut member 22. In this example, plurality of teeth 53D will flex back into plurality of continuous grooves 41D as continuous grooves 41D come into alignment with plurality of teeth 53D. Once end 40D of cap member 28D abuts against surface 12 of structure 14 and plurality of teeth 53D are in alignment with plurality of continuous grooves 41D, cap member 28D is secured to nut member 22 of end portion of metallic fastener assembly 11 and is positioned against surface 12.

In FIG. 11, first example 52D of end portion 10 of metallic fastener assembly 11 extending above surface 12 of structure 14 is seen wherein fourth embodiment of cap system 26D is shown enclosing and securing to end portion 10 of metallic fastener assembly 11. In first example 52D, nut member 22 is secured to one of threaded stud or threaded bolt 16 and directly abuts surface 12 (without a washer) and continuous grooves 41D of nut member 22 are engaged by plurality of teeth 53D and are positioned above surface 12 at an elevation profile lesser than that of second example 52D1.

In second example 52D1 fourth embodiment of cap system 26D encloses and secures to end portion 10 of metallic fastener assembly 11 positioned extending above surface 12. In second example 52D1, nut member 22 is secured to one of threaded stud or threaded bolt 16 and is positioned on washer 20 which positions plurality of continuous grooves 41D above surface 12 at a higher elevation profile than that of plurality of continuous grooves 41D of first example 52D. Plurality of teeth 53D within cap member 28D extending in direction D''' as seen in FIGS. 15 and 16 permit plurality of continuous grooves 41D of nut member 22 to be engaged in both the first example 52D and second example 52D1 with end 40D of sidewall 29D of cap member 28D abutting surface 12 of structure 14 thereby providing a secured enclosure of end portion 10 of metallic fastener assembly 11 regardless of the difference in elevation profile of plurality of continuous grooves 41D with respect to surface 12.

This similarly is the case with respect to third example 52D2 wherein nut member 22 is secured to one of threaded stud or threaded bolt 16 and is positioned on washer 20' and washer 20" raising the elevation profile of plurality of continuous grooves 41D in this third example 52D2 to even a higher elevation profile above surface 12 of structure 14 than second example 52C1. Again, plurality of teeth 53D extending in direction D''' permit plurality of continuous grooves 41D of nut member 22 to be engaged by plurality of teeth 53D in third example 52D2 with end 40D abutting surface 12 providing a secured enclosure of end portion 10 of metallic fastener assembly 11.

Thus, in this fourth embodiment of cap system 26D, the installer having tightened nut member 22 on threaded stud or threaded bolt 16 into a secured position relative to structure 14, the installer can then position fourth embodiment of cap member 28D over nut member 22 and push cap member 28D over nut member 22 flexing plurality of teeth 53D positioned on inner surface 30D of cap member 28C until cap member 28C abuts surface 12 of structure 14 and plurality of continuous grooves 41D of nut member 22 engage plurality of teeth 53D. Cap member 28D is then secured to nut member 22 of end portion 10 and abuts surface 12 of structure 14 enclosing end portion 10 of metallic fastener assembly 11. As explained above, with plurality of teeth 53D extending in direction D''', plurality of continuous grooves 41D of nut member 22 positioned at different elevation profiles above surface 12 can engage and reliably secure to plurality of teeth 53D securing cap member 28D to end portion 10 of metallic fastener assembly 11 with end 40D abutting surface 12 thereby securing cap member 28D to end portion 10 and enclosing end portion 10 of metallic fastener assembly 11.

In installing cap members of the cap system described above, selective configurations for ends 40A-D of cap members 28A-D respectively can be employed. Three examples of configurations of the configurations include examples 60, 70 and 90 to be discussed in greater detail below. For example, with respect to ends 40A and 40C, any of the three examples 60, 70 or 90 can be employed and for example, with respect to ends 40B and 40D, first or second examples 60 or 70 can be employed.

First example 60, shown in FIG. 4, end 40A, of cap member 28A forms a continuous annular flat surface 62 which will abut surface 12 of a planar configuration of structure 14 as seen in FIGS. 2-4.

Second example 70, of configuration of an end, is shown in FIGS. 8 and 16 as end 40B and 40D respectively. Since the second example 70 is the same configuration for FIG. 8 as is in FIG. 16, second example 70 will be described for end 40B, of FIG. 8, wherein sidewall 29B of cap member 28B defines groove 72 which extends about cap member 28B. First opening 74 defined by and extends through first portion 76 of sidewall 29B of cap member 28B communicates with groove 72 such that a path 78 extends through first opening 74 and into groove 72 for conveyance of sealant through first opening 74 into groove 72. Second opening 80, defined by and extends through first portion 76 of sidewall 29B of cap member 28B, is spaced apart about cap member 28B from first opening 74 wherein second opening 80 communicates with groove 72 such that second flow path 82 extends from groove 72 through second opening 80 of cap member 28B for conveyance of sealant.

With respect to second example 70, once installer has secured cap member 28B to surface 12 of structure 14, the installer will inject a sealant material into first opening 74 having sealant flow in groove 72 about cap member 28B until sealant begins to leak from second opening 80. At that point the installer has a confirmation that sealant has been positioned within groove 72 providing additional assurance to the installer that end portion 10 of metallic fastener assembly 11 has been further electrically isolated within cap member 28B. Second example 70 configuration provides the installer ability to not expel excessive sealant onto surface 12 and reduces the need for tedious and time consuming smoothing out of excess sealant.

Third example 90 of configuration of an end is shown in FIG. 12 as end 40C. Sidewall 29C of cap member 28C defines groove 92 which extends about cap member 28C. Third opening 94 defined by and extends through first portion 96 of sidewall 29C of cap member 28C such that third opening 94 communicates with groove 92. First flow path 98 extends through first portion 96 of sidewall 29C of cap member 28C and into groove 92 for conveyance of sealant. Fourth opening 100 defined by and extends through second portion 102 of sidewall 29C of cap member 28C such that fourth opening 100 communicates with groove 92 and fourth opening 100 communicates with cavity 32C of cap member 28C such that second flow path 104 extends from groove 92 through fourth opening 100 of sidewall 29C of cap member 28C and into cavity 32C. Once installer has injected sealant into groove 92 and sealant flows through groove 92 and expels into cavity 32C from fourth opening 100, the sealant continues to flow past nut member 22 between 46C, in this example, upwardly into cap member 28C. Fifth opening 106, as seen in FIGS. 9-11, defined by and extends through the sidewall 29C of cap member 28C such that fifth opening 106 provides a third flow path 108, as seen in FIG. 10.

With respect to third example 90, once the installer has secured cap member 28B to surface 12 of structure 14, the installer will inject a sealant material into third opening 94 having sealant flow in groove 92 about cap member 28C. With groove 92 is nearly full or full of sealant, sealant begins to leak from fourth opening 100. At that point, the installer is still injecting sealant into third opening 94 and cavity 32C becomes full of sealant at which point sealant begins to expel from fifth opening 106. At that point installer understands cap member 28C is full of sealant and stops injecting further sealant. With sealant expelling from fifth opening 106, installer has a confirmation that sealant has been positioned within groove 72 and cavity 32C providing additional assurance to the installer that end portion 10 of metallic fastener assembly 11 has been further electrically isolated within cap member 28B. This third example configuration provides the installer the ability to not expel excessive sealant onto surface 12 and reduces the need for tedious and time consuming smoothing out of excess sealant.

While various embodiments have been described above, this disclosure is not intended to be limited thereto. Variations can be made to the disclosed embodiments that are still within the scope of the appended claims.

What is claimed:

1. A cap system for enclosing a metallic fastener assembly extending through a structure, comprising:
   a first securement mechanism positioned about a periphery of a nut member of the metallic fastener assembly, wherein the first securement mechanism comprises a plurality of continuous grooves which extend about the periphery of the nut member;
   a cap member comprising:
      a sidewall having an inner surface which defines a cavity having a stepped inner wall dimensioned to receive the nut member and defines a second securement mechanism complementary configured to engage the first securement mechanism positioned about the periphery of the nut member; and
      an end of the sidewall of the cap member defines an opening to receive the nut member and provides the nut member access into the cavity, wherein the stepped inner wall of the cavity includes a first wall portion having a first diameter and a second wall portion having a second diameter less than the first diameter of the first wall portion, and the periphery along the continuous grooves defines a first diameter that is complementary to the first wall portion, and the periphery spaced from the continuous grooves defines a second diameter that is complementary to the second wall portion.

2. The cap system of claim 1, wherein the second securement mechanism comprises a plurality of teeth positioned along the inner surface of the cap member.

3. The cap system of claim 2, wherein the plurality of teeth which extend along the inner surface of the cap member, extend away from the end of the sidewall of the cap member.

4. The cap system of claim 2, wherein the plurality of teeth which extend about a portion of the inner surface of the cap member.

5. The cap system of claim 2, wherein the plurality of teeth are positioned in alignment with the plurality of continuous grooves of the nut member with the nut member positioned within the cap member.

6. The cap system of claim 5, wherein with the plurality of teeth in alignment with the plurality of continuous grooves, the end of the sidewall of the cap member is positioned abutting a surface of the structure and a washer is positioned between the nut member and the surface of the structure.

7. The cap system of claim 5, wherein with the plurality of teeth in alignment with the plurality of continuous grooves, the end of the sidewall of the cap member is positioned abutting a surface of the structure and two washers are positioned between the nut member and the surface of the structure.

8. The cap system of claim 5, wherein with the plurality of teeth in alignment with the plurality of continuous grooves, the end of the sidewall of the cap member is positioned abutting a surface of the structure and the nut member is positioned abutting the surface of the structure.

9. The cap system of claim 5, wherein with the plurality of teeth in alignment with the plurality of continuous grooves, at least a portion of the plurality of teeth engage at least a portion of the plurality of continuous grooves.

10. The cap system of claim 2, wherein the nut member, which includes the plurality of continuous grooves, is constructed of a metallic material.

11. The cap system of claim 10, wherein the plurality of teeth are constructed of a material more flexible than the metallic material.

12. The cap system of claim 11, wherein the material of the plurality of teeth comprises one of a polymer or a thermoset.

13. The cap system of claim 1, wherein the end of the sidewall of the cap member comprises a continuous annular flat surface.

14. The cap system of claim 1, wherein the nut member is formed of a metallic material, and wherein the end of the sidewall of the cap member comprises:
   a groove which extends about the cap member;
   a first opening defined by and extends through a first portion of the sidewall of the cap member wherein the first opening communicates with the groove such that a first flow path extends through the first opening and into the groove for receiving sealant to electrically isolate the nut member from outside of the cap member; and
   a second opening defined by and extends through the first portion of the sidewall of the cap member and spaced apart about the cap member from the first opening, wherein the second opening communicates with the groove such that a second flow path extends from the groove through the second opening of the cap member for receiving the sealant to electrically isolate the nut member from outside of the cap member.

15. The cap system of claim 1, wherein the nut member comprises threads which are compatible to engage threads of a threaded stud or a threaded bolt of the metallic fastener assembly.

16. The cap system of claim 1, wherein the nut member comprises a plurality of ridges spaced from the continuous grooves, and the ridges are configured to receive a tool to rotate the nut member.

17. A cap system for enclosing a metallic fastener assembly extending through a structure, comprising:
   a first securement mechanism positioned about a periphery of a nut member of the metallic fastener assembly, wherein the first securement mechanism comprises a plurality of continuous grooves which extend about the periphery of the nut member such that the continuous grooves surround a central axis and face outwardly away from the central axis;
   a cap member comprising:
      a sidewall having an inner surface which defines a cavity dimensioned to receive the nut member and defines a second securement mechanism complementary configured to engage the first securement mechanism positioned about the periphery of the nut member;
      an end of the sidewall of the cap member defines an opening that receives the nut member and provides the nut member access into the cavity; and
   wherein the nut member comprises a plurality of ridges that surround the central axis and face outwardly away from the central axis, and wherein the ridges and the continuous grooves are a different configuration from each other.

18. The cap system of claim 17, wherein the nut member includes a shoulder between the continuous grooves and the ridges such that the ridges are inset from the continuous grooves relative to the central axis, and the plurality of ridges extend in a radial direction away from the shoulder.

19. The cap system of claim 18, wherein the ridges adjacent to each other are spaced apart about the central axis.

20. The cap system of claim 19, wherein each of the ridges is equally spaced apart from the ridges adjacent to each other.

* * * * *